(12) United States Patent
Yamada

(10) Patent No.: US 7,110,498 B2
(45) Date of Patent: Sep. 19, 2006

(54) IMAGE READING APPARATUS AND X-RAY IMAGING APPARATUS

(75) Inventor: Etsuo Yamada, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 10/938,429

(22) Filed: Sep. 10, 2004

(65) Prior Publication Data
US 2005/0058252 A1    Mar. 17, 2005

(30) Foreign Application Priority Data
Sep. 12, 2003  (JP)  ............... 2003-321144
Sep. 12, 2003  (JP)  ............... 2003-321145

(51) Int. Cl.
*H05G 1/64* (2006.01)
(52) U.S. Cl. ............. 378/98.8; 250/208.1; 250/370.14; 348/308; 378/114
(58) Field of Classification Search ............... 378/98.8, 378/114; 250/370.09, 208.1, 370.08, 370.14; 348/302, 308, 310
See application file for complete search history.

(56) References Cited

U.S. PATENT DOCUMENTS

| | | | |
|---|---|---|---|
| 5,886,353 A | 3/1999 | Spivey et al. | |
| 6,084,939 A * | 7/2000 | Tamura | ............ 378/98.2 |

2002/0000528 A1   1/2002   Imai

FOREIGN PATENT DOCUMENTS

| | | |
|---|---|---|
| EP | 0 788 277 A 2 | 8/1997 |
| EP | 0 796 000 | 9/1997 |
| EP | 1 341 375 | 2/2003 |
| JP | 2002-341043 | 11/2002 |
| JP | 11 326527 | 3/2003 |
| JP | 2003-248060 | 9/2003 |

OTHER PUBLICATIONS

European Search Report: Munich, Mar. 14, 2005.
English Abstract for Japan application 2002-341043.

* cited by examiner

*Primary Examiner*—Edward J. Glick
*Assistant Examiner*—John M. Corbett
(74) *Attorney, Agent, or Firm*—Morgan & Finnegan LLP

(57) ABSTRACT

An image reading apparatus includes a DC/DC power supply which supplies power to at least part of the apparatus, a photodetector array including two-dimensionally arranged photoelectric conversion elements, and a line selector and reading circuit which read signals from the photoelectric conversion elements for each row in the photodetector array as a unit. A line driving signal in the line selector is set to be synchronized with a reference clock for defining the oscillation frequency of the DC/DC power supply and have a period of an integer multiple of the reference clock. A sample/hold signal for determining the timing at which a signal read from the photodetector array is sampled/held is output at a predetermined phase timing of each period of the line driving signal.

11 Claims, 15 Drawing Sheets

IMAGE READING APPARATUS AND X-RAY IMAGING APPARATUS

FIELD OF THE INVENTION

The present invention relates to driving control on an imaging apparatus which images an object to be examined by using radiation.

BACKGROUND OF THE INVENTION

Recently, so-called flat panel sensors have become popular as X-ray digital imaging apparatuses. These sensors have the potential to replace conventional imaging systems using films, and are designed to output data obtained by directly digitizing an X-ray image, and hence are expected to be developed in a wide range of applications. Many such flat panel sensors use amorphous silicon, and are required to increase imaging areas and resolution. At the same time, such sensors are required to achieve high sensitivity and high S/N ratio.

On the other hand, imaging units have recently been required to be reduced in size, and cassette type imaging units and the like have also been proposed (Japanese Patent Laid-Open No. 2003-248060). An imaging unit incorporates the above flat panel sensor, its driving circuit, a signal detection circuit, a digital circuit, a power supply circuit, and the like. Of these components, the power supply circuit is, in particular, a bottleneck in achieving a compact imaging unit. The power supply circuit generally acquires power from a commercial AC power supply, and hence includes a transformer for converting AC to DC and the like. As a consequence, the overall circuit increases in size. Mounting such a power supply circuit in an imaging unit makes it impossible to achieve a reduction in size. For this reason, there has been proposed a method of separating a power supply circuit portion which converts AC to DC from an imaging unit, causing this portion as a discrete power supply unit to generate a predetermined DC voltage, and applying it to the imaging unit through a power cable of several meters.

The imaging unit needs to apply different DC voltages to several circuits like those described above. Generating these voltages within the above discrete power supply unit and applying them to the imaging unit pose many problems in practical use, including drop voltage in the cable, superimposition of noise, and the like, if the length of a power cable is several meters or more. For this reason, the following method is employed: power is supplied at a relatively high DC voltage as a uniform voltage from the power supply unit, and a switching power supply (to be referred to as an SW power supply hereinafter) such as a DC/DC power supply is provided in the imaging unit to generate various voltages and apply them to the respective circuits. Although DC/DC power supplies have been increasingly miniaturized owing to recent technical advances, they produce conductive noise and radiation noise because they are SW power supplies. Such noise may be superimposed on peripheral circuits, and more particularly a sensor panel, amplifier IC, and A/D conversion circuit to affect images. Leakage magnetic field noise which is radiation noise may be magnetically coupled to peripheral circuits, and more particularly a detection system including a flat panel sensor and amplifier IC, to generate an induction noise voltage, thereby seriously affecting image quality.

In addition, in order to miniaturize the imaging unit, it is necessary to place the above flat panel sensor and other peripheral circuits closer to the DC/DC power supply as well as to reduce the size of the DC/DC power itself. Recently, with miniaturization of imaging units, the spatial distances between a power supply and a sensor and its peripheral circuits, which are incorporated in an imaging unit, have decreased more and more. As a consequence, the sensor has become susceptible to the influence of magnetic coupling, and more particularly leakage magnetic field noise from the DC/DC power supply. For this reason, noise is superimposed on a read signal from the sensor to cause line noise on images. It is therefore indispensable to provide countermeasures against noise in the DC/DC power supply.

In general, as measures to suppress electromagnetic wave noise such as leakage magnetic field noise from an SW power supply, the following measures have been executed: measures associated cable laying, measures at a component level such as a transformer, preventing magnetic field leakage by shielding the entire power supply, and the like. With only measures associated with cable laying, the noise suppressing effect is small. In addition, it is difficult to confine a leakage magnetic field with a magnetic field shield. In addition, this makes it difficult to achieve reductions in size and weight. As a measure at a component level, for example, rounding a switching waveform can reduce noise. This, however, reduces the conversion efficiency. In addition, an efficiency loss will lead to heat generation. In consideration of the problems associated with size, shape, weight, cost, heat, and the like, it is difficult to prevent the influences of leakage magnetic fields while miniaturizing the overall apparatus.

In addition, the above problems also originate from the fact that a very high level of measures against noise is required for a power supply because the signal level to be handled corresponds to microvolt-level voltages. For example, of general DC/DC power supplies, even high-quality power supplies cause ripples of several tens of millivolts and spike noise (conductive noise). Even noise of such a level is superimposed on an image signal through a route for supplying power to a detection circuit and affects an image.

With regard to ripple noise leaking at a main oscillation frequency, there are available measures to be taken at the noise source, a measure of adding an output filter circuit, and the like. A certain degree of effect can be obtained by such measures. In addition, in a low frequency band including a main oscillation frequency and the like, the low leakage ratio of noise from a signal amplifier power supply to signals effectively serves to reduce noise. However, high-frequency noise is produced at a switching point (ON/OFF switching point) in an oscillation signal for the DC/DC power supply. It is difficult to obtain effective results on such high-frequency noise by using the above measures.

Against high-frequency noise, a countermeasure component such as a ferrite core may be mounted in the apparatus. However, in consideration of reductions in size and weight and cost, it is not preferable to mount such an additional countermeasure component. In addition, measures to reduce noise may sometimes lead to a reduction in conversion efficiency, making it difficult to execute effective measures.

SUMMARY OF THE INVENTION

The present invention has been made in consideration of the above problems, and has as its object to provide stable images by reducing the influence of noise even if a switching power supply such as a DC/DC power supply is mounted in an imaging unit.

In order to achieve the above object, according to one aspect of the present invention, there is provided an image signal reading apparatus comprising: a switching power supply which supplies power; a detector array including two-dimensionally arranged detectors; a reading unit which reads signals from the detectors for each row in the detector array as a unit, and holds the signals in a hold portion; and a control unit which switches a read target row in the reading unit in synchronism with a reference clock for the switching power supply at a period of an integer multiple of the reference clock, and matches a hold timing of the hold portion for a signal with a predetermined phase in the reference clock.

Furthermore, according to another object of the present invention, there is provided an image signal reading apparatus comprising: a switching power supply which supplies power to at least part of the apparatus; a detector array including two-dimensionally arranged detectors; a reading unit which reads signals from the detectors for each row in the detector array as a unit; a conversion unit which sequentially converts signals corresponding to one line, which are read by the reading unit, into digital data on a pixel basis; and a control unit which stops conversion processing by the conversion unit at a point near a change point of an oscillation signal for the switching power supply.

In addition, according to the present invention, there is provided an X-ray imaging apparatus including an X-ray generator and the above image reading apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

<First Embodiment>

[1] Arrangement of X-ray Imaging System

Figure 1:
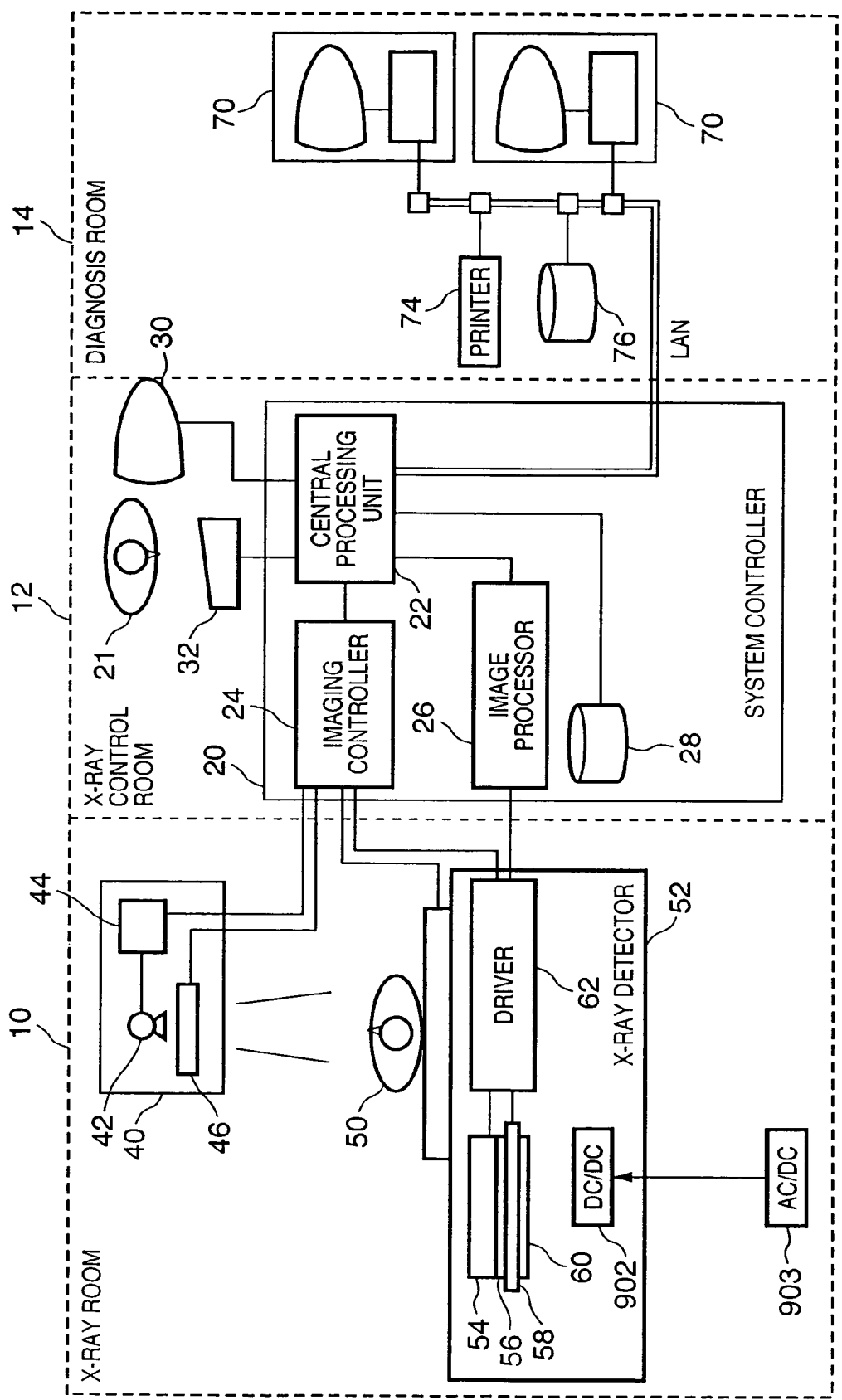
FIG. 1 is a schematic view showing an outline of an X-ray imaging system according to an embodiment.

FIG. 1 is a block diagram showing the arrangement of an X-ray imaging system according to this embodiment. Referring to FIG. 1, reference numeral 10 denotes an X-ray room; 12, an X-ray control room; and 14, a diagnosis room.

An X-ray generator 40 which generates X-rays and an X-ray detector 52 serving as an imaging unit are placed in the X-ray room 10. The X-ray generator 40 includes an X-ray tube 42 which generates X-rays, a high-voltage power supply 44 which drives the X-ray tube 42, and an X-ray aperture 46 which focuses an X-ray beam generated by the X-ray tube 42 in a desired imaging area.

The X-ray detector 52 detects an X-ray beam which is generated by the X-ray generator 40 and transmitted through an object 50 to be examined. The X-ray detector 52 includes a grid 54, scintillator 56, photodetector array 58, X-ray exposure amount monitor 60, driver 62, and DC/DC power supply 902. The grid 54 is formed from a low X-ray absorbing member and a high X-ray absorbing member (has, for example, a stripe structure formed from Al and Pb), and reduces the influence of scattered X-rays produced upon transmission through the object 50. Note that X-ray irradiation may be done while the grid 54 is moved so as not to produce any moiré in consideration of the grid ratio between the photodetector array 58 and the grid 54.

The scintillator 56 converts X-rays into visible light when the matrix material of the phosphor is excited (absorbed) by high-energy X-rays, and the resultant recombination energy generates fluorescence in the visible region. The scintillator 56 generates fluorescence by using either a matrix such as $CaWo_4$ or $CdWo_4$ or a fluorescence center material added into a matrix such as CsI:Tl or ZnS:Ag. The photodetector array 58 has photodetectors arranged in a two-dimensional pattern, and converts the visible light output from the scintillator 56 into an electrical signal. The scintillator 56 and photodetector array 58 constitute a so-called flat panel sensor. The X-ray exposure amount monitor 60 is placed to monitor an X-ray transmission amount. The X-ray exposure amount monitor 60 may directly detect X-rays by using a light-receiving element made of crystalline silicon or may detect fluorescence generated by the scintillator 56. In this embodiment, the X-ray exposure amount monitor 60 is formed from an amorphous silicon light-receiving element formed as a film on the lower surface of the substrate of the photodetector array 58.

The driver 62 drives the photodetector array 58 under the control of an imaging controller 24 to read a signal from each photodetector. Note that the operations of the photodetector array 58 and driver 62 will be described in detail later. The DC/DC power supply 902 converts a DC voltage from an AC/DC power supply 903 into one or a plurality of kinds of voltages and applies a predetermined voltage to each circuit in the X-ray detector 52. The AC/DC power supply 903 is a power supply which converts a voltage from a commercial AC power line into a predetermined DC voltage.

A system controller 20 is placed in the X-ray control room 12. A central processing unit 22 executes various control operations in this system, and manages, for example, display control on a monitor 30, analysis of an operation input through an operation panel 32, the imaging controller 24, an image processor 26, and an external storage device 28.

The imaging controller 24 controls the high-voltage power supply 44 on the basis of information from the X-ray exposure amount monitor 60 and controls an X-ray aperture 16 to form an X-ray beam corresponding to an imaging region. The imaging controller 24 also gives a drive instruction to the driver 62 in the X-ray detector 52. The image processor 26 performs image processing such as image data correction, spatial filtering, recursive processing, grayscale processing, scattered line correction, and dynamic range (DR) compression processing with respect to X-ray image data obtained from the driver 62.

The external storage device 28 is a large-capacity, high-speed storage device which stores basic image data processed by the image processor 26. The external storage device 28 stores image information reconstructed to meet a predetermined standard (e.g., Image Save & carry (IS & C)). The central processing unit 22 is connected to external devices, e.g., a terminal 70, image printer 74, and file server 76 in the diagnosis room 14, through a LAN, and transmits image data in accordance with a predetermined protocol (e.g., Digital Imaging and Communications in Medicine (DICOM)).

The terminal 70 performs image processing or the like for the purpose of supporting diagnosis with respect to an image (moving image/still image) transmitted through the LAN, or displays the image on the display. The image printer 74 prints out an image (still image) transmitted through the LAN onto, for example, a film. The file server 76 stores an image (moving image/still image) transmitted through the LAN and provides an X-ray image search function. Obviously, WAN connection may be provided to exchange X-ray images between hospitals. In addition, needless to say, a plurality of X-ray imaging systems can be connected to the LAN.

[2] Arrangement of Photodetector Array 58

Figure 2:
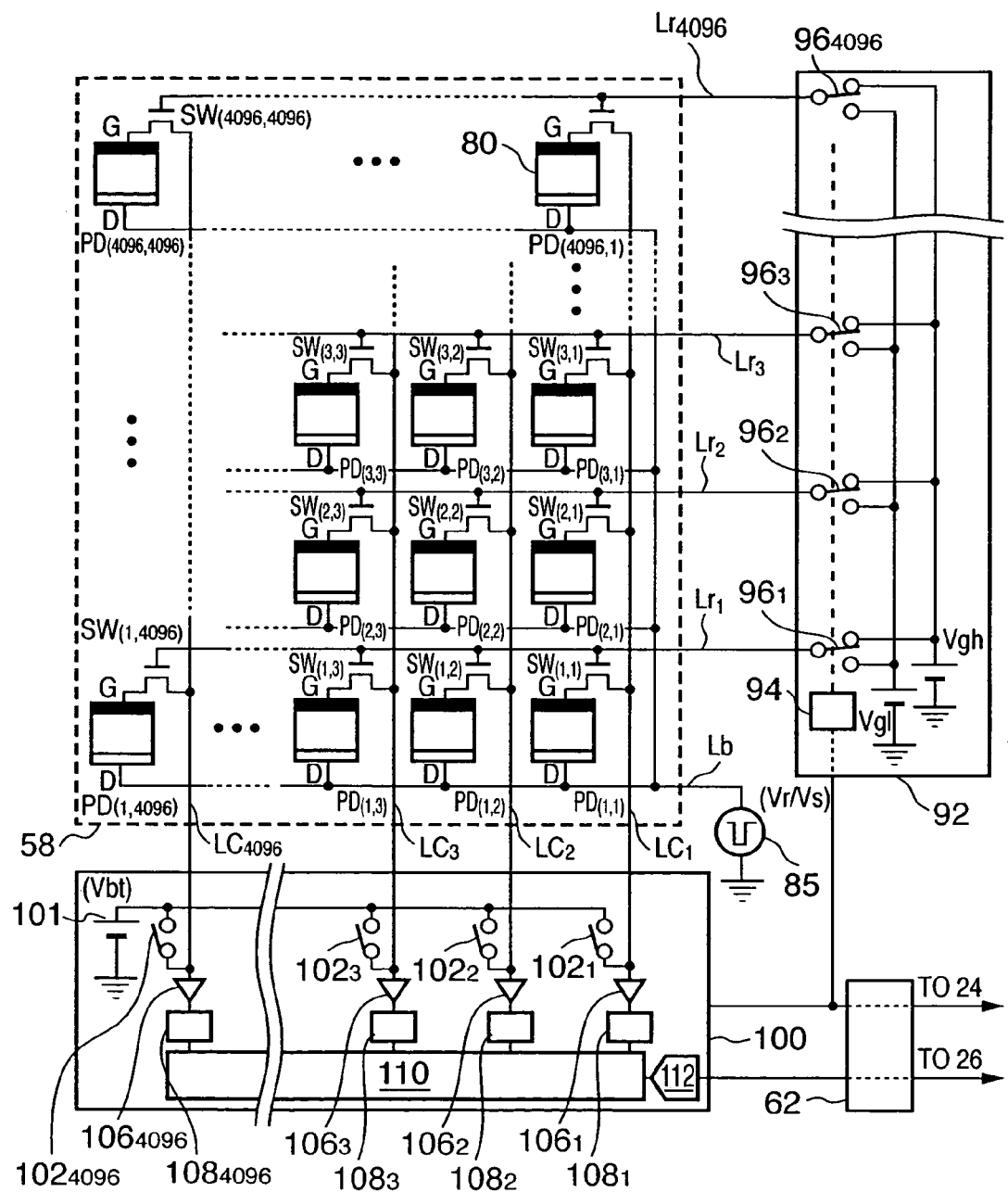
FIG. 2 is a schematic view showing an example of the arrangement of a photodetector array according to the embodiment.

The arrangement and operation of the photodetector array 58 will be described in detail next. FIG. 2 is an equivalent circuit of the photodetector array 58 including a two-dimensional array of photoelectric conversion elements.

One photodetection element is provided for one pixel. Each photodetection element is comprised of a photodetection portion (photoelectric conversion element $PD_{(m,n)}$) and a switching thin-film transistor (TFT switch $SW_{(m,n)}$) which controls the storage and reading of an electric charge. These photodetection elements are generally formed on a glass substrate by using amorphous silicon (a-Si). In this embodiment (FIG. 2), the photodetector array 58 is formed by arranging 4,096×4,096 photodetection portions in a two-dimensional pattern, and the array area is set to be 430 mm×430 mm. The size of one pixel is therefore about 105 μm×105 μm.

The gate electrode (G electrode) of the photoelectric conversion element $PD_{(m,n)}$ is connected to a column signal line $Lc_n$ common to the corresponding column via the TFT switch $SW_{(m,n)}$. For example, photoelectric conversion elements $PD_{(1,1)}$ to $PD_{(4096,1)}$ of the first column are connected to a column signal line $Lc_1$ of the first column. The D electrode of each photoelectric conversion element $PD_{(m,n)}$ is connected to a bias power supply 85 via a bias interconnection Lb. The control terminals of the TFT switches $SW_{(m,n)}$ are connected to a common row selection line $Lr_m$. For example, the control terminals of TFT switches $SW_{(1,1)}$ to $SW_{(1,4096)}$ of the first row are connected to a row selection line $Lr_1$ of the first row.

The row selection lines $Lr_1$ to $LR_{4096}$ are connected to a line selector 92. The line selector 92 includes an address decoder 94 which determines photoelectric conversion elements of a specific line from which signal electric charges are to be read on the basis of a control signal from the driver 62, and 4,096 switch elements ($96_1$ to $96_{4096}$) which switch application voltages (Vg1 or Vgh) to the control terminals of the respective TFT switches SW in accordance with an output from the address decoder 94. Note that the line selector 92 may be simply formed, as the simplest arrangement, from a shift register used for a liquid crystal display or the like.

With the above arrangement, when only the switch element $96_x$ connected to the arbitrary xth row selection line $Lr_x$ is switched to the Vgh side, the TFT switches $SW_{(x,1)}$ to $SW_{(x,4096)}$ of the xth row are turned on. As a consequence, stored electric charge signals are extracted from the photoelectric conversion elements $PD_{(x,1)}$ to $PD_{(x,4096)}$ of the corresponding row to column signal lines $Lc_1$ to $Lc_{4096}$.

The column signal lines $Lc_1$ to $Lc_{4096}$ are connected to a signal reading circuit 100. In the signal reading circuit 100, reset switches $102_1$ to $102_{4096}$ turn on/off connection between the respective column signal lines $Lc_1$ to $Lc_{4096}$ and a power supply 101 which applies a reset reference potential (Vbt). Preamplifiers $106_1$ to $106_{4096}$ amplify signal potentials from the respective column signal lines $Lc_1$ to $Lc_{4096}$. Sample/hold (S/H) circuits $108_1$ to $108_{4096}$ sample/hold outputs from the preamplifiers $106_1$ to $106_{4096}$. Reference numeral 110 denotes an analog multiplexer which multiplexes outputs from the S/H circuits $108_1$ to $108_{4096}$ on the time axis; and 112, an A/D converter which digitizes analog outputs sequentially supplied from the multiplexer 110. An output from the A/D converter 112 is supplied to the image processor 26.

Note that the storage time for signal charges is closely related to the A/D conversion time. Performing A/D conversion at high speed widens the band of the analog circuit and makes it difficult to achieve a desired S/N ratio. It is therefore required to shorten the image signal reading time without unnecessarily increasing the analog signal band and A/D conversion rate. As a technique of realizing this, the following technique may be employed. The photodetector array comprised of 4,096×4,096 pixels is segmented vertically into two regions or segmented horizontally and vertically into four regions, and pairs of analog multiplexers 110 and A/D converters 112 are provided for the respective segmented regions. These pairs are then simultaneously driven. However, as the number of A/D converters and multiplexers increases, the cost increases accordingly. It is therefore preferable to use an appropriate number of A/D converters (segmentation count) in consideration of the balance with cost instead of using many A/D converters at random.

Figure 3:
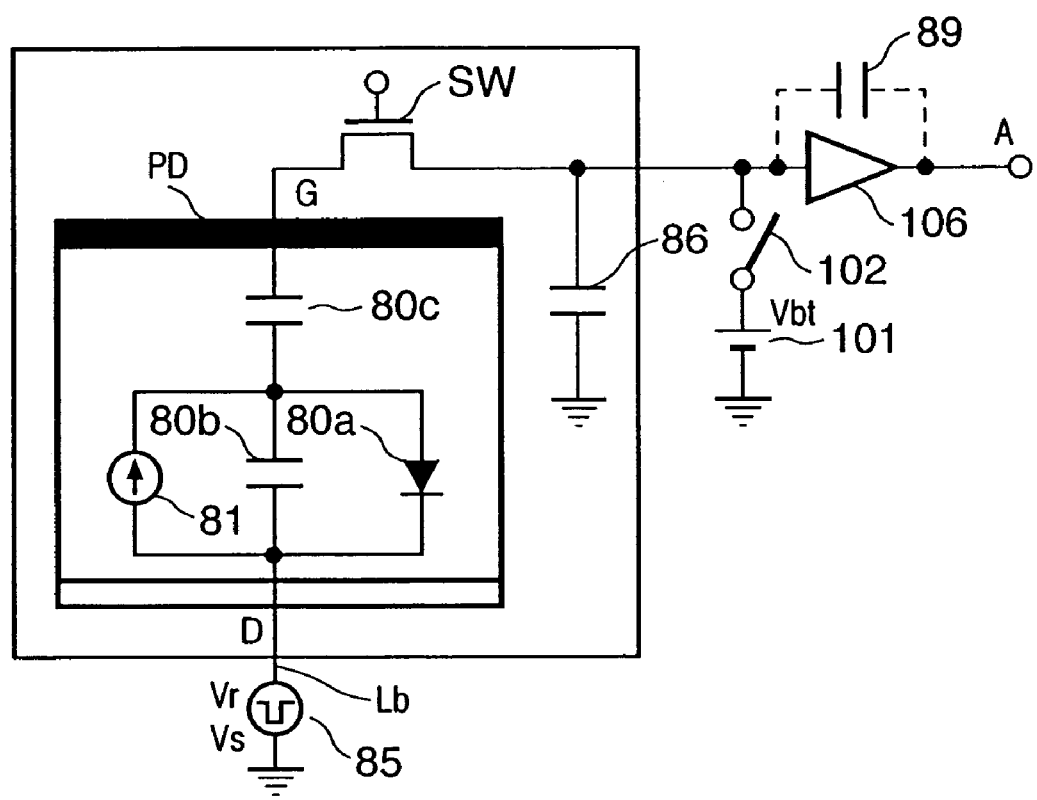
FIG. 3 is a schematic view for explaining a photodetection element in the photodetector array shown in FIG. 2.

FIG. 3 shows an example of an equivalent circuit of one photodetection element shown in FIG. 2. The photodetection portion PD is comprised of a parallel circuit of a photodiode 80*a* and a capacitor 80*b* and a capacitor 80*c* connected in series with the capacitor 80*b*. The electric charge generated by the photoelectric conversion is described as a constant current source 81. The capacitor 80b may be either a parasitic capacitance of the photodiode 80a or an additional capacitor which improves the dynamic range of the photodiode 80a. The common bias electrode (to be referred to as a D electrode hereinafter) of the photodetection portion PD is connected to the bias power supply 85 via the bias interconnection Lb. The electrode on the TFT switch SW side (to be referred to as a G electrode hereinafter) of the photodetection portion PD is connected to the capacitor 86 and an electric charge reading preamplifier 106 via the TFT switch SW. The input of the preamplifier 106 is connected to ground via the reset switch 102 and signal line bias power supply 101.

[3] Operation of Photodetector Array 58

The operation of the X-ray detector 52 of this embodiment including the photodetector array 58 will be described next. The driving form of the photodetector array 58 in this embodiment will be described first. The driving form of the photodetector array 58 includes a refresh mode and photoelectric conversion mode classified according to the manner of applying voltages to the D electrode and G electrode of each photoelectric conversion element. In the photoelectric conversion mode, idle reading, real reading, and correction reading are executed.

<Photoelectric Conversion Mode>

In the photoelectric conversion mode, three types of reading operations, i.e., idle reading, real reading, and correction reading, are executed. Before these "reading" operations, the driver 62 sets the voltage of the power supply 85 to a bias value Vs (>Vbt), and turns off all the switch element $102_1$ to $102_{4096}$ (disconnects all the column signal lines $Lc_1$ to $Lc_{4096}$ from the power supply 101), and sets all the switch elements $96_1$ to $96_{4096}$ to the Vgl side (turns off all the TFT switches $SW_{(1,1)}$ to $SW_{(4096, 4096)}$). This state will be referred to as the basic state of the photoelectric conversion mode hereinafter.

[Idle Reading]

Idle reading is driving operation for discharging the holes stored in the capacitors 86 and 89, i.e., the holes stored in the capacitors 80b and 80c and the like by respectively applying Vs and Vbt to the D electrode and G electrode of the photoelectric conversion element PD.

In idle reading in this embodiment, starting from the basic state of the photoelectric conversion mode (in this state, Vs has been applied to the D electrodes of all the photoelectric conversion elements PD), the following steps are executed:

(1) turning on all the switch elements $102_1$ to $102_{4096}$ to apply the reset reference potential Vbt to all the column signal lines $Lc_1$ to $Lc_{4096}$, (2) setting only the switch element $96_x$ to the Vgh side, and applying Vbt to the G electrodes of the photoelectric conversion elements $PD_{(x,1)}$ to $PD_{(x,4096)}$ corresponding to the corresponding row, and (3) sequentially executing step (2) described above for x=1 to 4096.

In the above idle reading operation, all the row selection lines Lr can be simultaneously set to Vgh. In this case, however, the signal interconnection potential greatly deviates from the reset voltage Vbt upon completion of preparation for reading, and hence it is difficult to obtain a signal with a high S/N ratio. In addition, in the above sequence, the row selection lines $Lr_1$ to $Lr_{4096}$ are sequentially selected and reset in the order named. However, these row selection lines can be reset in an arbitrary order under the control of the driver 62 on the basis of the settings in the imaging controller 24.

[Real Reading and Correction Reading]

Real reading is driving operation for reading signal electric charges from the photoelectric conversion elements PD after X-ray irradiation. Correction reading is driving operation for acquiring a dark image for correction after real reading. In the real reading and correction reading, the photodetector array 58 operates in the same manner. That is, Vs is applied to the electrode D, and the TFT switch SW is turned on while the reset switch 102 is OFF, thereby a potential corresponding to the amount of light received is applied from the photoelectric conversion element to the column signal line Lc.

The following is an outline of a sequence in real reading and correction reading according to this embodiment. Starting from the basic state of the above photoelectric conversion mode, the following steps are executed:

(1) discharging electric charges stored in the capacitors 86 and 89 by turning on/off the switch elements $102_1$ to $102_{4096}$ (resetting the amplifier input portions), (2) extracting stored electric charge signals from the photoelectric conversion elements $PD_{(x,1)}$ to $PD_{(x,4096)}$ on the row selection line $Lr_x$ onto the column signal lines $Lc_1$ to $Lc_{4096}$ by setting only the switch element $96_x$ to the Vgh side, (3) amplifying the stored electric charge signals using the preamplifiers $106_1$ to $106_{4096}$ and holding them in the S/H circuits $108_1$ to $108_{4096}$, (4) multiplexing the signals held in the S/H circuits $108_1$ to $108_{4096}$ into a series signal and converting it into digital data using the A/D converter 112, and (5) sequentially repeating the above operation for x=1 to 4096 to acquire all pixel data.

Note that during the execution of step (4) described above, steps (1) and (2) are executed for the next row selection line $Lr_{x+1}$, and step (3) is executed for the corresponding selected row (x+1) upon completion of step (4).

<Refresh Mode>

The refresh mode servers to relieve the saturated state of holes in the photoelectric conversion elements PD, and is performed to release the holes stored in the capacitors 80b, 80c, and the like which cannot be removed by the above idle reading, in particular. In the refresh mode, the bias power supply 85 is set at Vr, and the reset switch 102 and TFT switch SW are turned on to set D electrode potential<G electrode potential (Vr<Vbt), thereby releasing holes stored in the capacitors 80b, 80c, and the like.

In the refresh mode, the driver 62 operates the photodetector array 58 shown in FIG. 2 in the following sequence:

(1) applying Vr to the D electrodes of all the photoelectric conversion elements PD by setting the bias power supply 85 to the bias voltage Vr, (2) applying the reset reference potential Vbt to all the column signal line $Lc_1$ and $Lc_{4096}$ by turning on the switch elements $102_1$ to $102_{4096}$, and (3) applying the reset reference potential Vbt to the G electrodes of all the photoelectric conversion elements PD by switching all the switch elements $96_1$ to $96_{4096}$ to the Vgh side.

<Driving Control on Photodetector Array in Imaging System>

Figure 4:
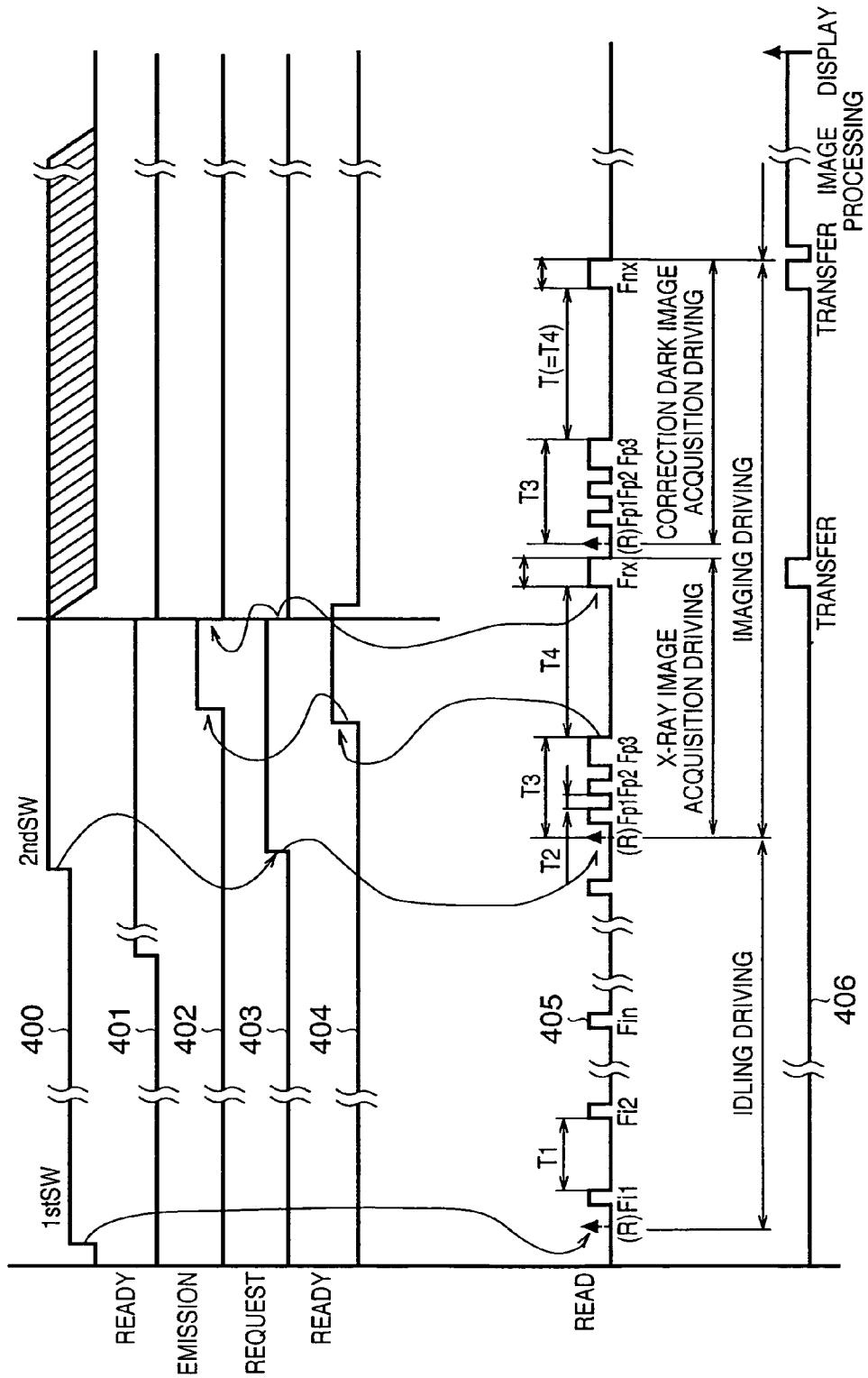
FIG. 4 is a timing chart of the X-ray imaging system according to the embodiment.

The execution timing of each driving form described above will be described in detail next with reference to the timing chart of FIG. 4. Referring to FIG. 4, reference numeral 400 denotes an imaging request signal generated by user operation on the operation panel 32; 401, an X-ray generator ready signal; 402, an actual X-ray emission state; 403, an imaging request signal to be supplied from the imaging controller 24 to the driver 62 on the basis of an instruction from an operator 21; 404, an X-ray detector ready signal from the X-ray detector 52; and 405, a driven state of the X-ray detector 52 (operation of reading electric charges from the photodetector array 58, in particular). Reference numeral 406 conceptually denotes the transferred state of image data, image processing, and a display state.

When an imaging preparation request is generated through the operation panel 32 (400: 1stSW), the imaging controller 24 outputs an instruction to shift the X-ray generator 40 and X-ray detector 52 to the imaging preparation state (imaging preparation request instruction). Upon receiving the imaging preparation request instruction, the driver 62 starts to perform idling driving operation of repeating, as one set, one refresh mode operation (R) and n idling reading operations (F1 to Fn) (405). Note that if a sensor which need not perform refresh mode operation is used, refresh mode operation is unnecessary. In addition, upon receiving the imaging preparation request instruction, the X-ray generator 40 starts to warm up the rotor of the tube, and outputs the X-ray generator ready signal 401 to the imaging controller 24 upon completion of imaging preparation.

Note that the operator 21 need not consciously generate the above imaging preparation request instruction. More specifically, when patient information, imaging information, or the like is input to the operation panel 32, the imaging controller 24 may interpret it as an imaging preparation request instruction and shift the X-ray generator 40 and X-ray detector 52 to the detector preparation state.

When an imaging request instruction (400: 2ndSW) is input by operation on the operation panel 32, the imaging controller 24 controls imaging operation while synchronizing the X-ray generator 40 with the X-ray detector 52. First of all, the imaging controller 24 asserts the X-ray imaging request signal 403 with respect to the X-ray detector 52 in accordance with the imaging request instruction (400: 2ndSW). In response to the X-ray imaging request signal 403, the driver 62 immediately switches the idling driving operation to the imaging driving operation (405).

In the imaging driving operation, as indicated by the imaging apparatus driven state 405, X-ray image acquisition driving and correction dark image acquisition driving are performed. X-ray image acquisition driving includes detection preparation driving (T3), an irradiation period (T4), and real reading (Frx). In detection preparation driving, refresh operation (R) and idle reading (Fp: Fp1, Fp2, and Fpf in FIG. 4) are executed in a predetermined sequence. When these operations are complete, the driver 62 determines that imaging preparation for the X-ray detector 52 is complete, and returns the X-ray detector ready signal 404 to the imaging controller 24. The imaging controller 24 detects the transition of the X-ray detector ready signal 404, and asserts the X-ray generation request signal 402 with respect to the X-ray generator 40.

The X-ray generator 40 generates X-rays while receiving the X-ray generation request signal 402. When a predetermined amount of X-rays are generated (i.e., a predetermined period of time elapses), the imaging controller 24 stops X-ray irradiation by negating the X-ray imaging request signal 403 and X-ray generation request signal 402. When the X-ray imaging request signal 403 is negated, an image acquisition timing is notified to the X-ray detector 52. Based on this timing, the driver 62 negates the X-ray detector ready signal 404 after the lapse of a predetermined wait time for the stabilization of the signal reading circuit 100, and reads image data from the photodetector array 58 (real reading (Frx)). The read image data (raw image) is supplied to the image processor 26. When this processing is complete, the driver 62 shifts the signal reading circuit 100 to the standby state again. Note that the interval between the end of detection preparation driving and the start of reading of image data is defined as an X-ray irradiation period (T4).

When real reading is complete in the above manner, X-ray image acquisition driving is finished. In the above real reading operation, the electric charge storage time of each sensor corresponds to the interval between the instant at which the reset operation is complete, i.e., the TFT switch SW is turned off in idle reading (Fpf) immediately before real reading, and the instant at which the TFT is turned on in real reading. Consequently, different electric charge storage times and timings are set for the respective selection rows. For this reason, the image obtained by real reading is corrected to absorb the above differences in conditions and the like by using the correction dark image obtained by correction reading.

For this purpose, the X-ray detector 52 starts correction dark image acquisition driving after X-ray image acquisition driving to acquire a correction dark image, and transfers it to the image processor 26. Although correction dark image acquisition driving includes detection preparation driving (T3), a ready period without X-ray irradiation (T5), and correction reading (Frn), the operation of the X-ray detector 52 itself is the same as detection preparation driving (T3), the X-ray irradiation period (T4), and real reading (Frx) in X-ray image acquisition driving. That is, the sequence for X-ray image acquisition driving is the same as the sequence for correction dark image acquisition driving except that X-ray irradiation is not executed.

X-ray image acquisition driving may slightly vary in X-ray irradiation time and the like. In correction dark image acquisition driving, the same sequence including such variations is recreated to acquire a dark image. A high-quality X-ray image can be obtained by correcting an X-ray image by using the dark image obtained in this manner. In the arrangement in which the grid is moved during an X-ray irradiation period, the movement of the grid may be inhibited when a dark image is to be acquired.

In addition, the number of times of idle reading (Fp) and a time interval T2 in X-ray image acquisition driving are set in advance before an imaging request is output from the imaging controller 24. Note, however, that as the number of times of idle reading (Fp) and the time interval T2, optimal values are selected in accordance with a request from the operator 21 depending on whether importance is placed on operability or image quality, or automatically selected on the basis of the imaging region or the like. The period (T3) between the instant at which an irradiation request is generated and the instant at which imaging preparation is complete is required to be short in practice, and hence the time interval T2 of idle reading (Fp) is preferably minimized. In addition, when an irradiation request is generated, the above imaging sequence driving is quickly started regardless of the state of idling driving. This makes it possible to shorten the period (T3) between the instant at which an irradiation request is generated and the instant at which imaging preparation is complete, thereby improving the operability.

In this embodiment, different operation patterns are employed for idle reading (Fi) in idling driving operation and idle reading (Fp) in detection preparation driving during X-ray image acquisition driving. In an idling driving period, in order to minimize reading operation which imposes a load on the photodetector array 58 (TFT switches SW in particular), an execution interval T1 of idle reading (Fi) is set to be longer than that (T2) in detection preparation driving operation, and the ON time of the TFT switch SW is set to be shorter than that in real reading operation. In this embodiment, in detection preparation driving as well, idle reading with a short ON time of TFT is executed a predetermined number of times, and idle reading (Fpf) with the same ON time of TFT as that in real reading is executed immediately before the start of real reading.

[4] Operation of Image Processor 26

Figure 5:
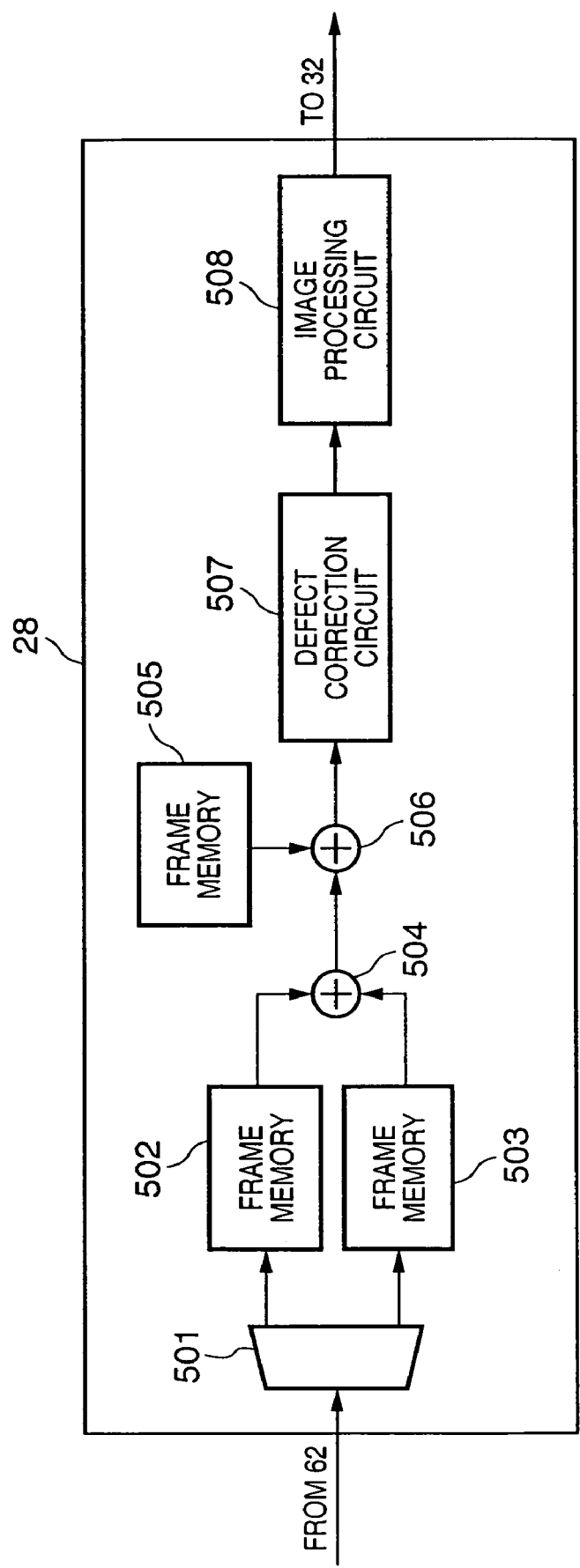
FIG. 5 is a block diagram showing the flow of processing for an acquired image in the embodiment.

FIG. 5 is a view showing the flow of image data in the image processor 26. Reference numeral 501 denotes a multiplexer which selects a data path, 502 and 503, X-ray image and dark image frame memories; 504, an offset correction circuit; 505, a gain correction data frame memory; 506, a gain correction circuit; and 507, a defect correction circuit. Reference numeral 508 representatively denotes other image processing circuits.

An X-ray image acquired by real reading (Frx) in X-ray image acquisition driving in FIG. 4 is stored in the X-ray image frame memory 502 through the multiplexer 501. A correction dark image acquired by correction reading (Frn) in dark image acquisition driving is stored in the dark image frame memory 503 through the multiplexer 501.

The offset correction circuit 504 performs offset correction by, for example, subtracting the image in the dark image frame memory 503 from the image in the X-ray image frame memory 502. The gain correction circuit 506 performs gain correction by, for example, dividing the offset-corrected image by gain correction data acquired in advance and stored in a gain correction frame memory. The gain-corrected data is then transferred to the defect correction circuit 507 to be continuously interpolated so as to eliminate a sense of incongruity at insensitive pixel portions or joint portions of the X-ray detector 52 comprised of a plurality of panels, thereby completing sensor-dependent correction processing originating from the X-ray detector 52. Furthermore, the image is subjected to general image processing in the remaining image processing circuits 508, e.g., grayscale processing, frequency processing, and enhancement processing. The resultant image data is stored in the external storage device 28, or the sensed image is displayed on the monitor 30.

[5] Countermeasures Against Noise Originating from DC/DC Power Supply

The operation of the X-ray imaging system of this embodiment, and more particularly the operation of reading an image from the photodetector array 58, has been described above. In this embodiment, in order to further improve the image quality, the above operation in real reading and correction reading is synchronized with a reference clock which defines the switching operation of the DC/DC power supply 902 incorporated in the X-ray detector 52 to acquire a high-quality sensed image with little noise. This point will be described in detail below.

Figure 6:
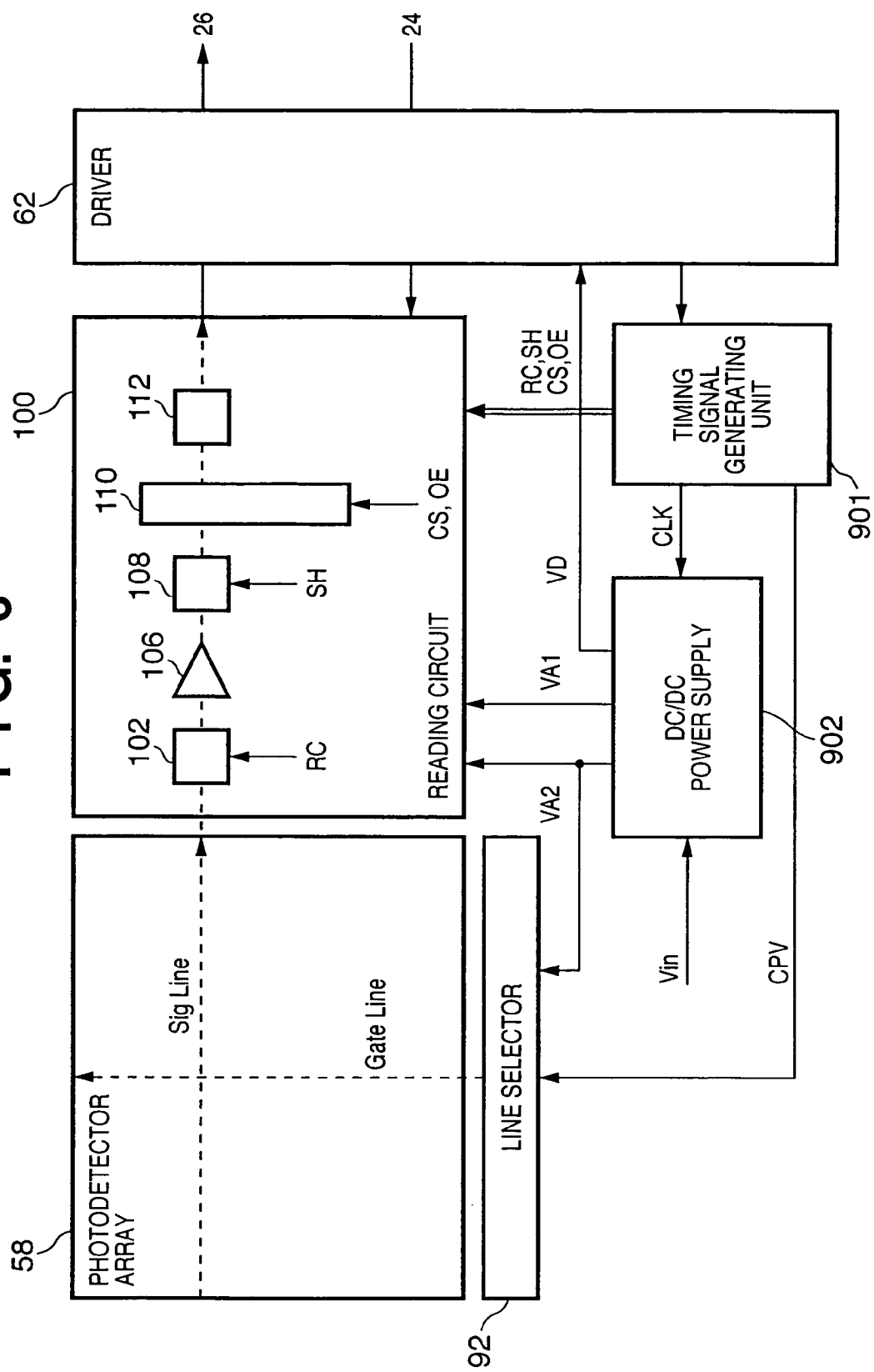
FIG. 6 is a view showing the main circuit arrangement of the X-ray imaging system according to the embodiment.

FIG. 6 is a block diagram showing a detailed arrangement associated with the operation of reading a signal from the photodetector array 58. The photodetector array 58, driver 62, line selector 92, analog multiplexer 110, A/D converter 112, and DC/DC power supply 902 have already been described with reference to FIGS. 1 and 2. A switch element 102, preamplifier 106, and S/H circuit 108 represent the switch elements $102_1$ to $102_{4096}$, preamplifiers $106_1$ to $106_{4096}$, and S/H circuits $108_1$ to $108_{4096}$, respectively.

A timing signal generating unit 901 outputs signals CLK, CPV, SH, RC, OE, and CS on the basis of instructions from the driver 62. Note that the timing signal generating unit 901 generates various kinds of timing signals by frequency-dividing a high-frequency master clock. The DC/DC power supply 902 converts an input voltage from the AC/DC power supply 903 into, for example, output voltages VA1, VA2, and VD, and outputs them.

Figure 7:
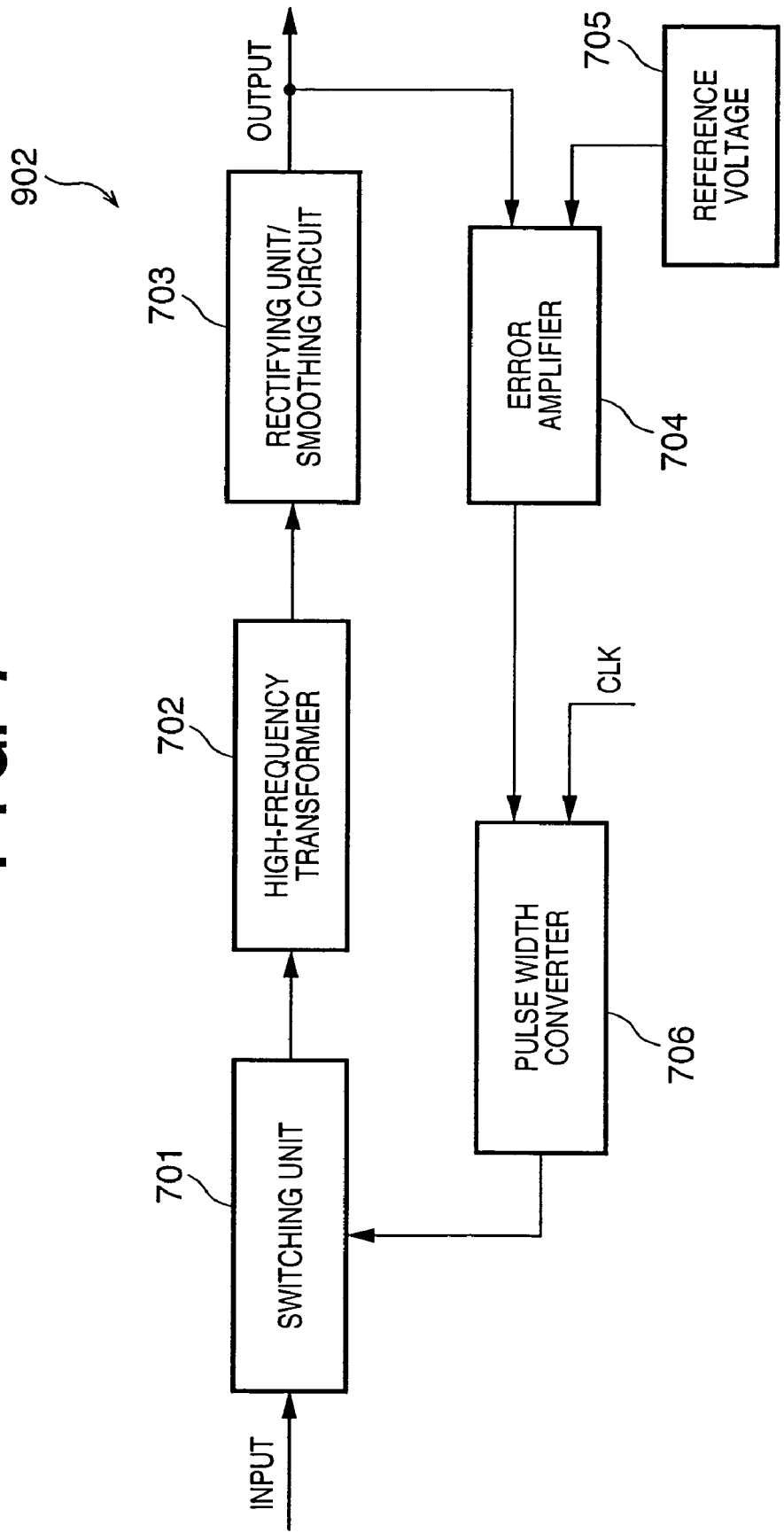
FIG. 7 is a block diagram for explaining the operation of a DC/DC power supply in the embodiment.

FIG. 7 is a view for explaining the operation of the DC/DC power supply 902. FIG. 7 shows a DC/DC power supply based on a pulse width control scheme (to be referred to as PWM hereinafter). This control scheme is designed to control an output voltage by changing the pulse width while keeping the frequency of an oscillation signal constant, and is mainstream among various types of control schemes. The operation of the DC/DC power supply 902 will be described below.

When a DC voltage is applied to a switching unit 701, this voltage is converted into a high-frequency AC voltage by the unit 701 and applied to the primary side of a high-frequency transformer 702. The high-frequency AC voltage is transferred, via the high-frequency transformer 702, to a rectifying unit/smoothing circuit 703 connected to the secondary side of the transformer. The rectifying unit/smoothing circuit 703 rectifies the high-frequency AC voltage using a rectifying diode, and applies it as a DC voltage with little ripple to a load via a smoothing filter.

The output voltage is always sensed by an error amplifier 704 so as to stabilize the output. The error amplifier 704 compares the output voltage with a reference voltage (705), and detects and amplifies the error therebetween. The amplified error signal is sent to a pulse width converter 706 serving as a control circuit on the next stage, in which the signal is converted into a control signal for controlling PWM. The pulse width converter 706 obtains an oscillation signal by using the reference clock CLK and converts the pulse width in accordance with the error signal. The control signal output from the pulse width converter 706 is fed back to the switching unit 701 to control it so as to stabilize its output.

The above description is made as regard to the basic operation of the DC/DC power supply 902 based on the PWM scheme. A general DC/DC power supply generates an oscillation signal by using an output from a built-in CR oscillator. In contrast, the DC/DC power supply 902 in this embodiment generates an oscillation signal by fixed oscillation using the reference clock CLK. In addition, the switching unit 701 includes switches based on various types of schemes, e.g., a forward switch, flyback switch, push-pull switch, and bridge switch, and also includes a switch having primary and secondary sides insulated and a switch having primary and secondary sides uninsulated. Since all these switches are known, a detailed description thereof will be omitted.

With regard to input and output voltages, in this embodiment, output voltages are mainly about DC 5 V, and input voltage are about DC 50 V. If an input voltage is set to DC 50 V, which is relatively high, since a current can be suppressed, an external power cable can be made relatively compact. An output voltage required for the X-ray imaging unit will be described below. Note that the magnitude relationship between input and output voltages is not limited to that in this embodiment, and the present invention can be effectively applied to a case wherein input voltage<output voltage.

Figure 8:
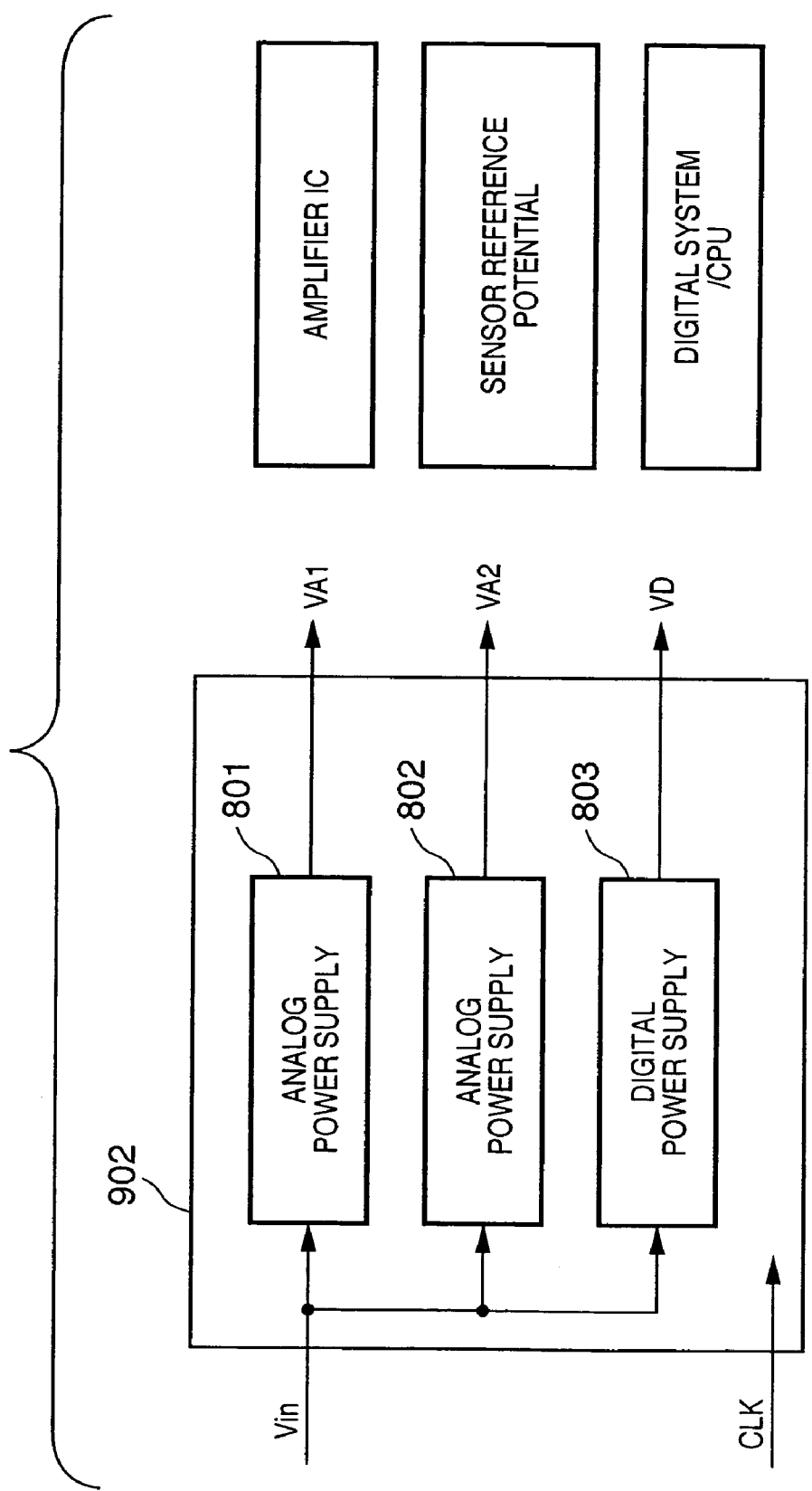
FIG. 8 is a block diagram of the DC/DC power supply used in the X-ray imaging system according to the embodiment.

FIG. 8 shows an example of a power supply block which generate various kinds of voltages in the DC/DC power supply 902 according to this embodiment. This supply block is a combination of three power supplies each having the basic circuit of the DC/DC power supply described with reference to FIG. 7. An analog power supply 801 applies the voltage VA1 to an amplifier IC which amplifies an output from the sensor panel. An analog power supply 802 applies the voltage VA2 as a reference potential to the sensor panel, the amplifier IC, and a driver IC. These analog power supplies output voltages upon minimizing conductive noise such as ripple noise and spike noise. This is because, since the signal level output from the sensor panel is very low, reducing the noise of the power supply on which the signal level is based is essential to improve image quality. A digital power supply 803 applies the voltage VD to the driver 62, the timing signal generating unit 901, and other digital circuits (not shown).

If the DC/DC power supply incorporates several systems and CHs (Channels), the occurrence of crosstalk noise between the CHs poses a conspicuous problem in realizing miniaturization, i.e., high packing density. Leakage magnetic fields from CHs mounted adjacent to each other are superimposed on each other. When the respective frequencies are different from each other, crosstalk noise occurs in the form of beats. In general, when a power supply has a plurality of outputs, the corresponding oscillation frequencies are not strictly managed.

In this embodiment, letting all the CHs use a single clock (CLK) supplied from the timing signal generating unit 901 synchronizes all the CHs with each other, thereby reducing the influence of crosstalk between the CHs. However, the present invention is not limited to this because all the CHs need not be synchronized in some case depending on the arrangement to be used. In addition, using an efficiency-oriented clock (e.g., an internal clock obtained from the CR oscillator incorporated in the power supply) for CHs which produce little noise and the reference clock CLK for CHs which produce much noise makes it possible to realize both efficiency and reduction in noise. In addition, an analog regulator may be used for a portion where a further reduction in noise is required. This, however, decreases the efficiency of the power supply, and hence such a regulator should be used for a limited portion where no problems occur in terms of heat generation and cost.

The main noise sources in the DC/DC power supply include the switching unit 701, the rectifying unit of the rectifying unit/smoothing circuit 703, the high-frequency transformer 702, and the like, which produce conductive noise transferred on conductors and electromagnetic induction noise originating from leakage magnetic fields to a space. It is especially difficult to take countermeasures against leakage magnetic fields from the DC/DC power supply. Conventional countermeasures such as a shield can reduce noise to a certain extent. However, in the case of the apparatus of this embodiment which handles a very low signal level, even reduced leakage magnetic fields cause electromagnetic induction in the signal detection circuit including the sensor panel and amplifier IC, resulting in noise on an image.

Figure 9:
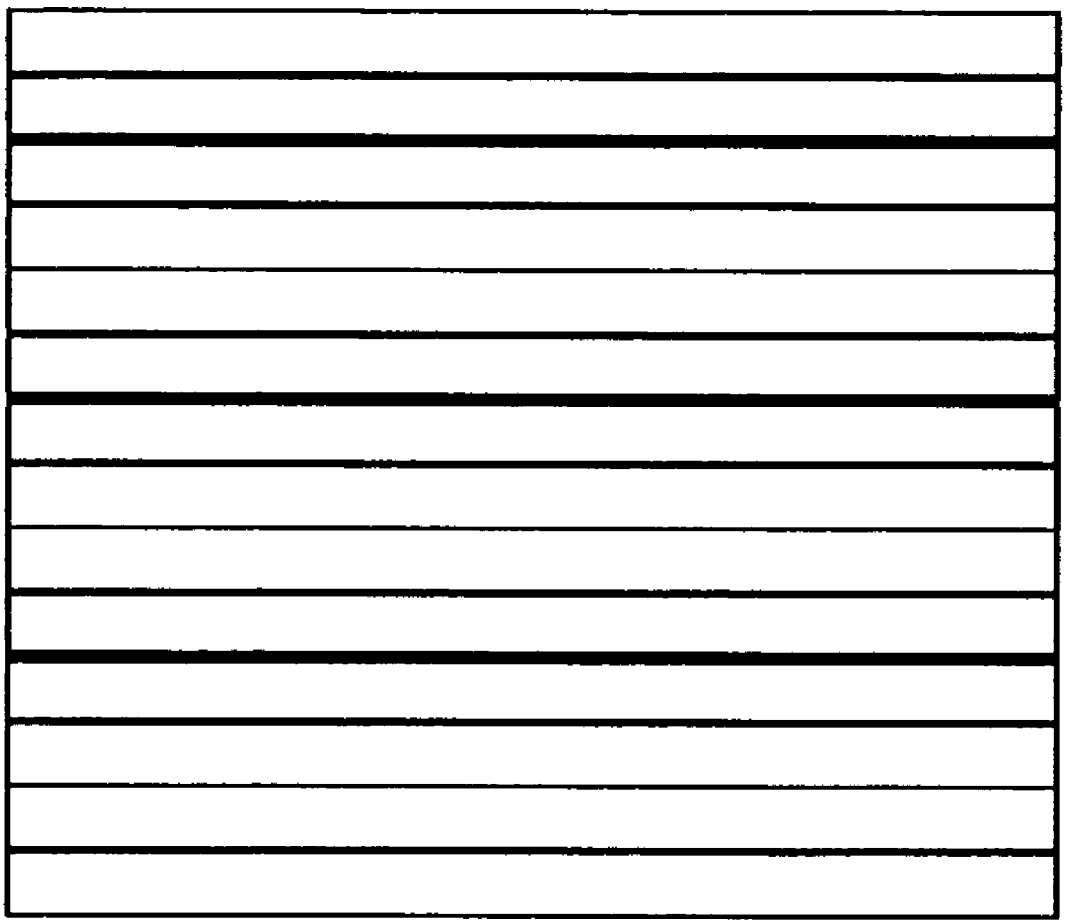
FIG. 9 is a view showing an example of line-noise-generated image.

FIG. 9 is a view showing image noise produced when leakage magnetic fields cause electromagnetic induction in photodetection portions, i.e., line noise that occurs for each gate line (row selection line Lr). Gate lines and signal lines (column signal lines Lc) are laid out in the horizontal direction and vertical direction, respectively. Assume that in this case, strong line noise occurs every five gate lines. Line noise is superimposed on a sensed image in this manner, and hence considerably degrades the image quality. In the case of a medical image, in particular, such noise may cause a wrong diagnosis.

This line noise occurs in the following manner. When the relationship between the position (timing) at which a signal on a signal line is sampled/held and the phase of noise superimposed on the signal line in synchronism with CLK from the DC/DC power supply sequentially shifts for each line, beats with a predetermined frequency appear as line noise on the image. Letting Fl (sampling frequency) be the driving frequency of one line, and Fn be the noise frequency from the DC/DC power supply, a line noise frequency Fln of the image is given by noise-sampling beats on the assumption that noise is superimposed during sampling, and hence can be given by $$Fln = ABS(Fn - i \times Fl) \leq Fl$$

(where i is a positive integer equal to or more than 0)

$$Fln/Fl = ABS(Fn/Fl - i) \leq 1$$

In this case, if Fn/Fl=i+d (where d is a decimal part), substituting this equation into the above mathematical expression yields $$Fln/Fl = d \leq 1$$

Therefore, the line noise frequency Fln is given by $$Fln = d \times Fl$$

If, for example, d=0.2, line noise occurs every five lines. It is therefore obvious that if an integer multiple relationship is set between the noise frequency Fn from the DC/DC power supply 902 and the sampling frequency Fl, the influence of line noise can be reduced.

Realization of such operation will be described below with reference to the timing chart of FIG. 10 and FIG. 6.

When image information is to be read from the photodetector array 58, the timing signal generating unit 901 generates a reference clock CLK for the DC/DC power supply 902 and a line driving signal CPV with a period of an integer multiple of CLK. A sample/hold signal SH is synchronized with the line driving signal CPV, and has the same frequency as that of the line driving signal CPV. In general, the oscillation frequency of the DC/DC power supply is 10 kHz to several hundred kHz, and a line driving frequency (switching frequency for row selection lines) for driving the photodetector array 58 is several kHz. If, for example, the frequency of CLK is 100 kHz, and the line driving frequency is 2 kHz, the frequencies of CLK and CPV (and SH) have an integer multiple relationship. The reason why an integer multiple relationship is set has already been described in detail above. FIG. 10 shows in a simple manner that the line driving signal CPV and sample/hold signal SH are synchronized with the reference clock CLK of the DC/DC power supply 902 within one line, CLK has an integer multiple relationship with the line frequency of CPV, and CLK is continuous between lines.

As described above, in real reading (Frx), pixel signals are read on a row basis. FIG. 10 shows reading operation on the Nth row. First of all, the timing signal generating unit 901 generates a reset signal RC in synchronism with the reference clock CLK. The switch element 102 is turned on/off by the reset signal RC to reset the column signal line Lc. In accordance with the line driving signal CPV, the line selector 92 turns on the TFT switch SW of the selected row selection line, and turns on the OE signal to enable the output of the multiplexer 110. The electric charges stored in the respective photoelectric conversion elements PD on the selected row selection line Lr are transferred to the signal reading circuit 100 via the column signal line Lc and integrated by the preamplifier 106. The timing signal generating unit 901 sends out the sample/hold signal SH to cause the sample/hold circuit 108 to hold the output voltage value from the preamplifier 106.

Subsequently, the timing signal generating unit 901 sends out a line driving signal in the same manner and sends out the signal line reset signal RC for reading the next line. The voltage value held on the previous line is sent to the A/D converter 112 to be converted into a digital signal until the next sample/hold signal is sent out.

Figure 11:
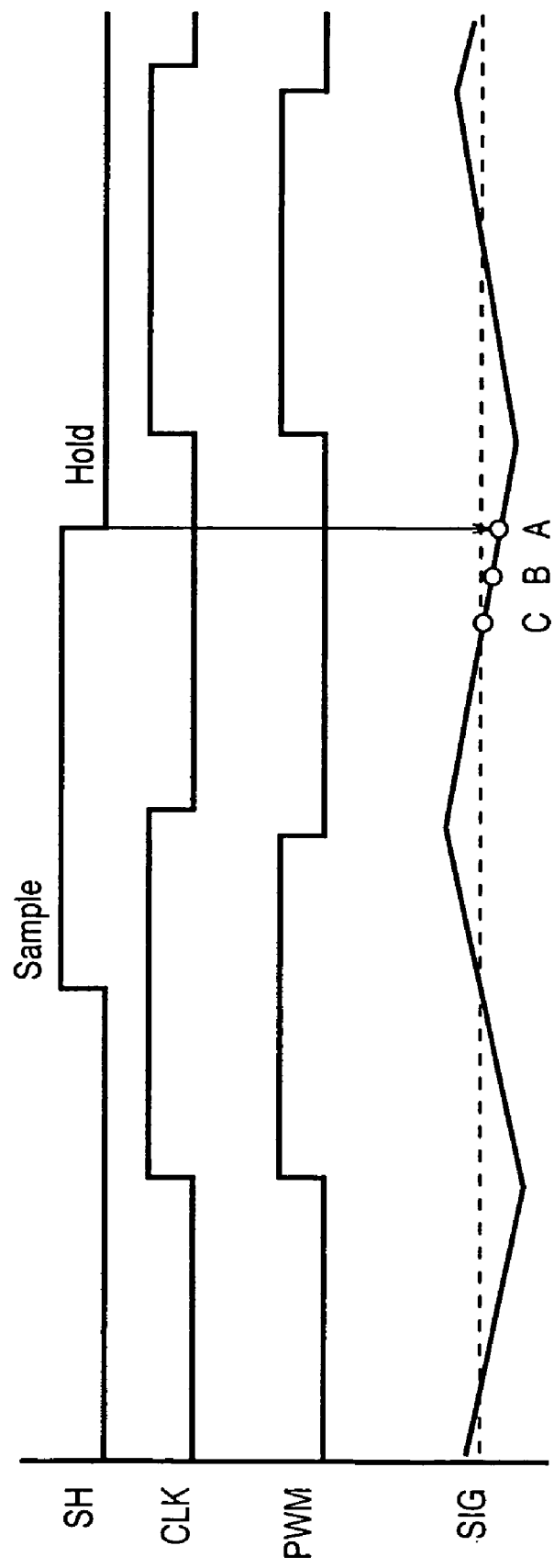
FIG. 11 is a timing chart for explaining synchronization of the X-ray image system according to the embodiment.

In consideration of mounting requirements, for example, 256 systems of reset switches 102, preamplifiers 103, and sample/hold circuits 108, with each system including a switch element, preamplifier, and S/H circuit for one signal line, are integrated into an IC. In the case of the photodetector array 58 including 4,096 columns as in this embodiment, 16 ICs are required. Since a plurality of ICs are used, they are sequentially selected one by one by a selection signal. FIG. 11 shows how five ICs are sequentially selected by CS signals 0 to 4. Outputs from a selected IC are sent to the A/D converter 112 via the multiplexer 110. The outputs of 256 systems from the IC are sequentially converted into digital signals by the A/D converter 112.

By repeating the above operation, all the lines are read. The timing (phase) of each signal sent out from the timing signal generating unit 901 within one line is kept unchanged and constant. For example, the reset signal RC and line driving signal CPV have a period of an integer multiple of the reference clock CLK, and the sample/hold signal SH is turned on after a predetermined period of time elapses since RC or CPV is turned on. In this case, the sample/hold signal SH may be turned on when a predetermined number of master clocks is counted after RC or CPV is turned on. For this reason, the phase of the oscillation signal (CLK signal) of the DC/DC power supply 902 at the timing of sampling/holding is kept the same on all the lines. Even if, therefore, the timing at which sampling/holding is performed coincides with a point where power supply noise is large, since all the lines are read at the same point, i.e., noise with the same phase is superimposed, it becomes hard to see noise on lines on an image.

Figure 10:
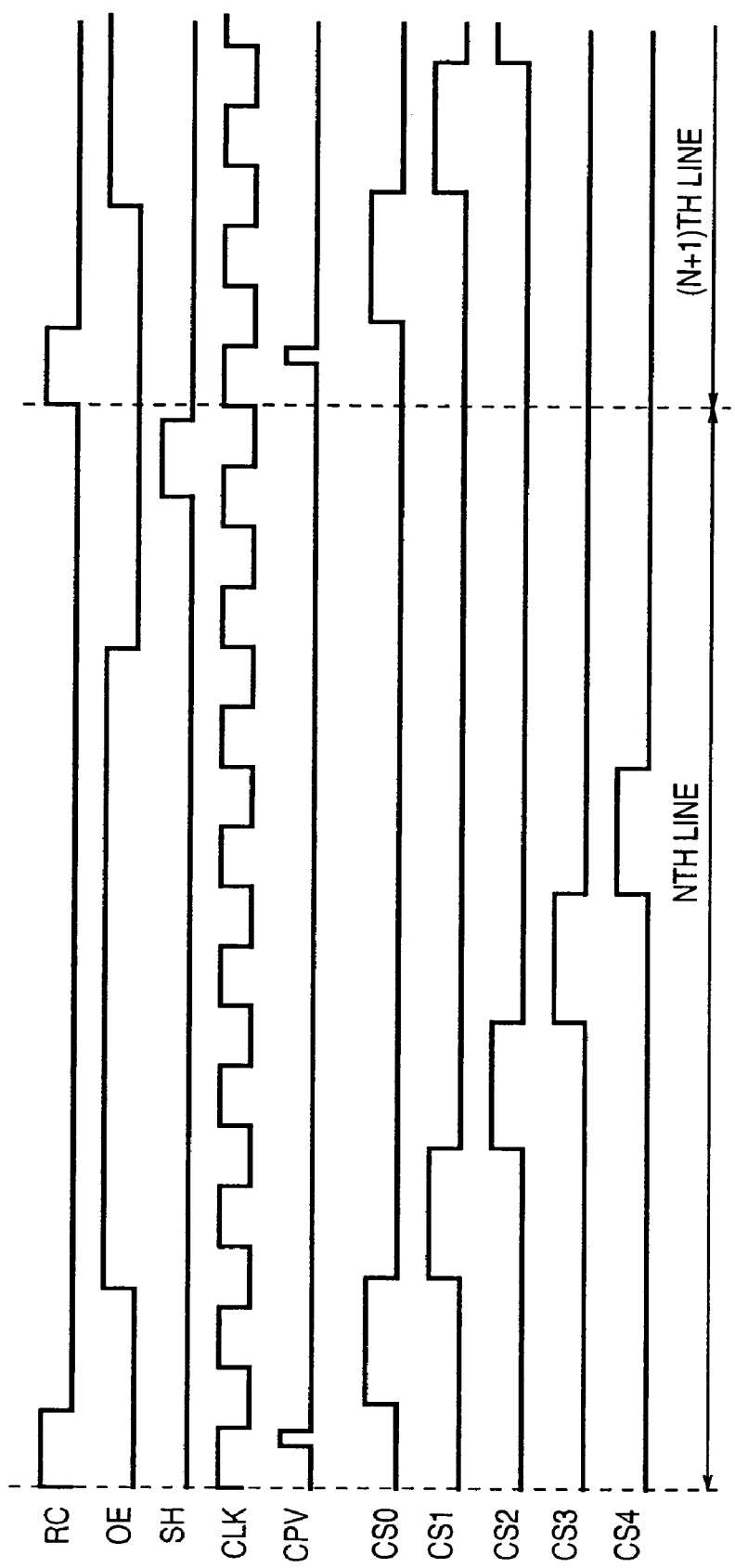
FIG. 10 is a timing chart for explaining synchronization of the X-ray image system according to the embodiment.

FIG. 11 is an enlarged view of part of the timing chart of FIG. 10. The above description will be supplemented by using FIG. 11. Each of the sample/hold the signals SH, the clock signal CLK, an amplitude modulation signal PWM, and a signal SIG output from the preamplifier 106 has a fixed phase relationship within one line. In this case, the signal PWM is a pulse width modulation signal which changes in accordance with a load in the DC/DC power supply 902 which oscillates at CLK, i.e., a signal actually oscillated by the DC/DC power supply 902.

Noise due to a leakage magnetic field accompanying the oscillation of the DC/DC power supply 902 is electromagnetically coupled to the signal detection system, and a noise signal synchronized with PWM (simply represented by a rectangular wave) is superimposed on the output signal SG from the amplifier 106. According to this embodiment, letting A be a point on SIG at which a signal is held from a sample state by the sample/hold circuit 108, a holding point on the next line coincides with the point A. Even if noise is superimposed on the SIG signal in this manner, sampling each line with the same phase within the CLK period can reduce line noise when visualization is performed. In contrast, in general, since each phase relationship shifts for each line, the holding point sequentially changes from A to B and C, resulting in the occurrence of line noise like that shown in FIG. 9.

Obviously, it is further effective to match a sampling/holding point with a timing at which little noise occurs by adjusting an integer multiple value. Although the case wherein CLK is 100 kHz, and the line driving frequency is 2 kHz has been described as an example, the present invention is not limited to this, and no problems occur with other integer multiple values. In addition, the magnitude relationship between the frequencies described above may be reversed. It is an important point that the phase relationship between the sample/hold timing within each line and CLK for the DC/DC power supply remains unchanged, and the frequency of CLK is continuous between lines. These conditions are satisfied when the line driving frequency and the CLK frequency for the DC/DC power supply have an integer multiple relationship and are synchronized with each other. If CLK is not continuous, a stable output cannot be obtained because the DC/DC power supply is controlled on the assumption that CLK is continuous and stable.

It is preferable that an arrangement including the constants of the respective circuits of the DC/DC power supply and its components be designed to optimize the conversion efficiency of the DC/DC power supply. Obviously, constants, an arrangement, and components are preferably selected to further reduce ripple noise and spike noise.

Note that the DC/DC power supply 902 is designed to operate (by free run) by using a clock generated by a CR oscillator (not shown) in the power supply when the reference clock CLK from the timing signal generating unit 901 is not input. Such a DC/DC power supply can be operated on the reference clock CLK in real reading and correction reading, and can be operated by free run at other timings. If, therefore, a free-run frequency is set at an efficient point in the DC/DC power supply 902, the total efficiency of the system can be improved.

In addition, since the pulse width slightly changes in accordance with a load owing to PWM, the spectrum of output ripple slightly changes. However, since the main spectrum, which is most important, hardly changes, no practical problems arise. Note that if the constant of the smoothing circuit and the response characteristics of PWM are optimized, the influence of a change in spectrum can be further reduced.

This embodiment has exemplified the PWM type DC/DC. However, similar effects can be obtained even in the case of a frequency modulation type by controlling the line driving frequency to a frequency of an integer multiple of the modulation frequency in accordance with the modulation frequency generated from the DC/DC power supply. In this case, it suffices to set the SH signal in the following manner. The oscillation frequency of a PWM type DC/DC power supply is fixed by CLK. In a frequency modulation type DC/DC power supply, an output voltage is stabilized by changing the oscillation frequency of a clock with a change in load. According to the frequency modulation type, therefore, a spontaneous oscillation clock (to be referred to as CLKS) is used to drive the power supply. The timing signal generating unit 901 receives CLKS from the DC/DC power supply 902 and controls the occurrence timing of the SH signal. More specifically, the timing signal generating unit 901 generates the SH signal after a predetermined count of master clocks from an inflection point (leading or trailing edge) of CLKS within the interval between the instant at which the OE signal is turned off in accordance with the completion of the output of the multiplexer and the instant at which the next line is selected. Note that the SH signal is generated only once within one line. Fixing the count of master clocks from an inflection point of CLKS in this manner can fix a sampling point relative to a noise phase.

As described above, according to this embodiment, even if a magnetic field leaks from the DC/DC power supply 902 placed in the X-ray detector 52, induction noise superimposed on the sensor which appears as noise on an image can be reduced by setting an integer multiple relationship between the line driving frequency and the oscillation frequency of the DC/DC power supply. In addition, synchronously driving a plurality of channels (CHs) in the DC/DC power supply 902 at the same CLK makes it possible to eliminate beats between a plurality of outputs, thereby achieving a further reduction in noise.

In order to enhance the effect, it is effective to select a point at which noise from the DC/DC power supply is low as a sample/hold timing within a line as well as setting an integer multiple relationship.

Obviously, if the DC/DC power supply itself can be covered with a shield case, line noise on an image can be further reduced. In addition, the application of the present invention is not limited to a DC/DC power supply, and a similar effect can be obtained even if the present invention is applied to an AC/DC power supply. Furthermore, the present invention can be applied not only to a PWM type power supply but also to a frequency modulation type DC/DC power supply, and can be adapted to a wide variety of switching power supplies.

In this embodiment, the timing signal generating unit 901 is designed to generate the reference clock CLK for the switching power supply, the line driving signal CPV, and the sample/hold signal SH. That is, signals to be synchronized with each other are generated by the single timing signal generating unit 901, and hence timing management is facilitated.

According to the first embodiment described above, even if a switching power supply such as a DC/DC power supply is mounted in the imaging unit, the influence of noise can be reduced, and a stable image can be provided.

<Second Embodiment>

The operation of an X-ray imaging system of the second embodiment, and more particularly the operation of reading an image from a photodetector array 58, is the same as that described in the first embodiment with reference to FIGS. 1 to 5. In the second embodiment, in the above "real reading" operation, the operations of a multiplexer 110 and A/D converter 112 are controlled to reduce the influence of spike noise accompanying the switching operation of a DC/DC power supply 902, thereby improving image quality. This point will be described in detail below.

Figure 12:
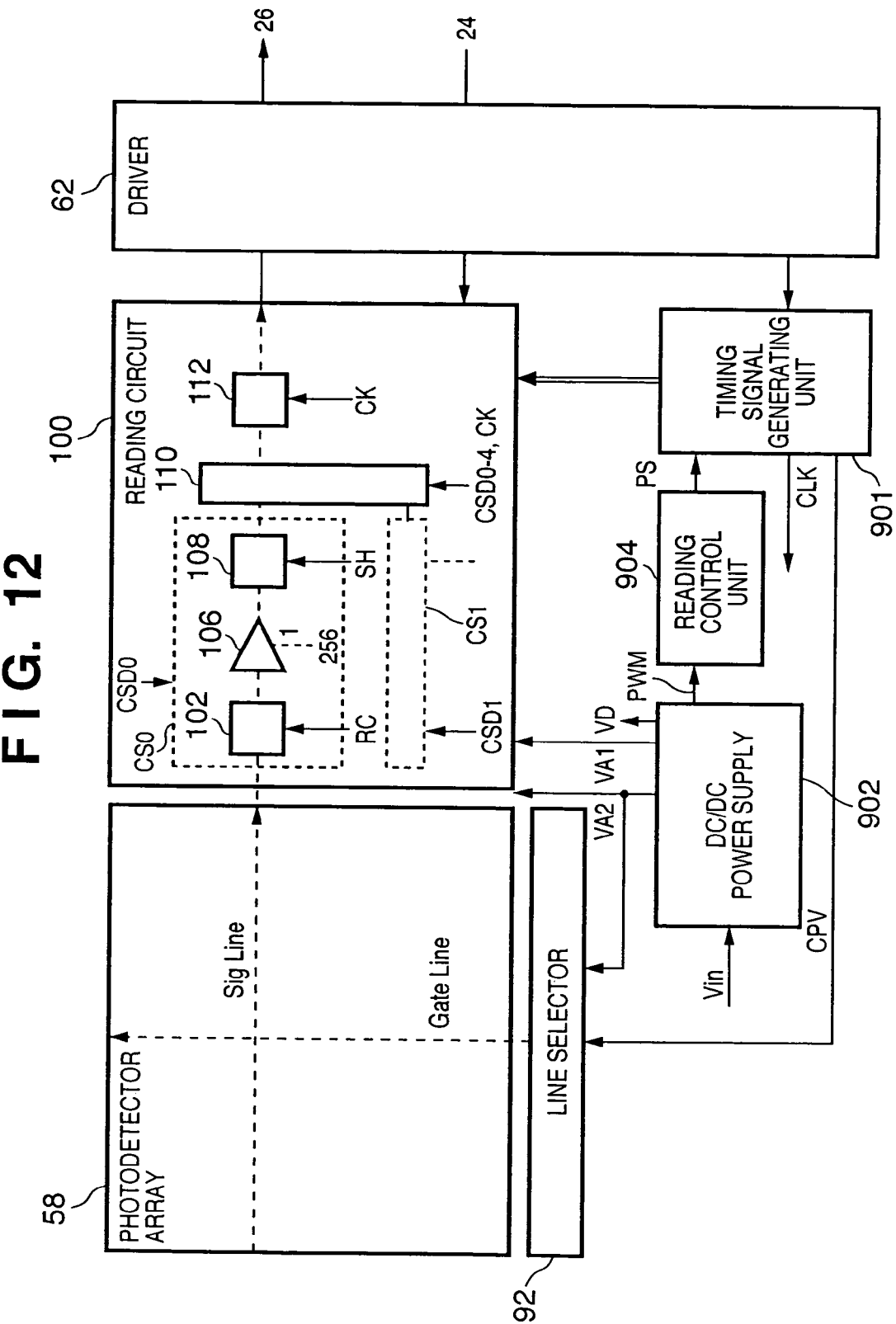
FIG. 12 is a view showing the main circuit arrangement of an X-ray imaging system according to the second embodiment.

FIG. 12 is a block diagram showing a detailed arrangement associated with the operation of reading a signal from the photodetector array 58. The photodetector array 58, a driver 62, a line selector 92, the multiplexer 110, the A/D converter 112, and the DC/DC power supply 902 are the same as those described with reference to FIGS. 1 and 2. In addition, a switch element 102, preamplifier 106, and sample/hold circuit 108 respectively represent switch elements $102_1$ to $102_{4096}$, preamplifiers $106_1$ to $106_{4096}$, and S/H circuits $108_1$ to $108_{4096}$ in FIG. 5.

A timing signal generating unit 901 outputs signals CLK, CPV, SH, RC, OE, and CSD0 to CSD4 on the basis of instructions from the driver 62. The DC/DC power supply 902 generates an oscillation signal (PWM signal) for a PWM type DC/DC power supply by using the CLK signal from the timing signal generating unit 901. The DC/DC power supply 902 converts an input voltage from an AC/DC power supply 903 into, for example, output voltages VA1, VA2, and VD, and outputs them.

A reading control unit 904 receives a pulse width modulation signal PWM as an oscillation driving signal for the DC/DC power supply 902, and outputs a spike noise occurrence period signal PS indicating a transient period during which spike noise occurs. More specifically, the reading control unit 904 outputs the signal PS with a predetermined width by detecting the leading edge and trailing edge of the PWM signal. When reading a signal from the photodetector array 58 by driving a signal reading circuit 100, the timing signal generating unit 901 refers to the PS signal from the reading control unit 904 to control the output of a clock CK for driving the multiplexer 110 and A/D converter 112 and the signals CSD0 to CSD4 for selecting an amplifier IC (to be described later).

When outputs from the photodetector array 58 are held by the sample/hold circuit 108 and the multiplexer 110 sequentially sends these data to the A/D converter 112 to A/D-convert them, the A/D conversion processing is stopped while the spike noise occurrence period signal PS is ON. That is, the timing signal generating unit 901 stops A/D conversion processing by outputting CK while the spike noise occurrence period signal PS is ON, and resumes A/D conversion processing by restarting to output CK again when the signal PS is turned off. This operation will be described in detail later with reference to FIGS. 14 and 15.

The signal reading circuit 100 is comprised of a plurality of ICs, the multiplexer 110, and the A/D converter 112. In this case, an amplifier IC is realized by integrating, for example, 256 systems, each including the switch element 102, preamplifier 106, and sample/hold circuit 108, into an IC. In the case of the photodetector array 58 including 4,096 columns as in this embodiment, 16 ICs are required. Since a plurality of ICs are used, they are sequentially selected one by one by a selection signal (CSD). For ease of explanation, assume that five amplifiers ICs are sequentially selected by CSD0 to CSD4. Outputs from the amplifier IC selected by the CSD signal are input to the multiplexer 110. The multiplexer 110 sequentially sends the 256 signals supplied from the selected amplifier IC to the A/D converter 112.

CK and CSD0 to CSD4 have been input to the multiplexer 110. When CSD0 is turned on by the timing signal generating unit 901, outputs from the amplifier IC are selected, and the selected amplifier IC outputs are sequentially selected and output from 1 to 256 by CK. The analog data sequentially output from the multiplexer 110 are converted into digital signals by the A/D converter 112 in accordance with CK. Note that the A/D converter 112 serves to A/D-convert outputs from the multiplexer 110. In practice, CK for A/D sampling is delayed from a clock used to drive the multiplexer 110 by about ½ clock. For ease of explanation, however, assume that these clocks are regarded as the identical clocks CK in the following description.

The operation and arrangement of the DC/DC power supply 902 are the same as those described in the first embodiment with reference to FIGS. 7 and 8.

As described in the first embodiment, the main noise sources in the DC/DC power supply include a switching unit 701, the rectifying unit of a rectifying unit/smoothing circuit 703, a high-frequency transformer 702, and the like. Surge currents are generated in the switching unit 701 with abrupt changes in voltage/current due to high-speed ON/OFF operation of the switching elements. These currents cause conductive noise. When a rectifying diode used for the rectifying unit is used for rectification at a high frequency, electric charge stored in the forward direction is left, even after the generation of a voltage in the reverse direction, owing to the carrier storage effect, and a current flows in the reverse direction for a short period of time. This causes recovery noise, which in turn generates a surge voltage. In the high-frequency transformer 702, most of the magnetic flux generated by a current flowing in a coil passes through the core with high permeability, but part of the magnetic flux is radiated into the air via a gap or the like. This leakage magnetic field causes electromagnetic induction noise in peripheral circuits.

Noise produced from the DC/DC power supply has been described above. Various countermeasures against such noise are conceivable: against leakage electromagnetic field noise as radiation noise, devising shields at a component level, shielding the entire DC/DC power supply, and the like.

Against surge voltage noise produced in the form of spike when the PWM signal is switched ON/OFF, there are available countermeasures such as connecting elements which suppress the occurrence of noise, e.g., snubber circuits, to circuit elements such as a switching unit and rectifying unit. These countermeasures are mainly taken against conductive noise. In addition, against such noise, countermeasures associated with the ground system of a circuit are required. Spike noise is transferred on a high-frequency signal, and not only normal mode noise but also common mode noise are produced, i.e., the same noise is superimposed on both the output side and the ground side, and hence a sufficient noise reduction effect cannot be obtained by an output filter such as a low-pass filter alone. Against common mode noise, a countermeasure component such as a ferrite core may be mounted in the apparatus. However, in consideration of reductions in size and weight and cost, it is not preferable to mount such a countermeasure component.

Figure 13:
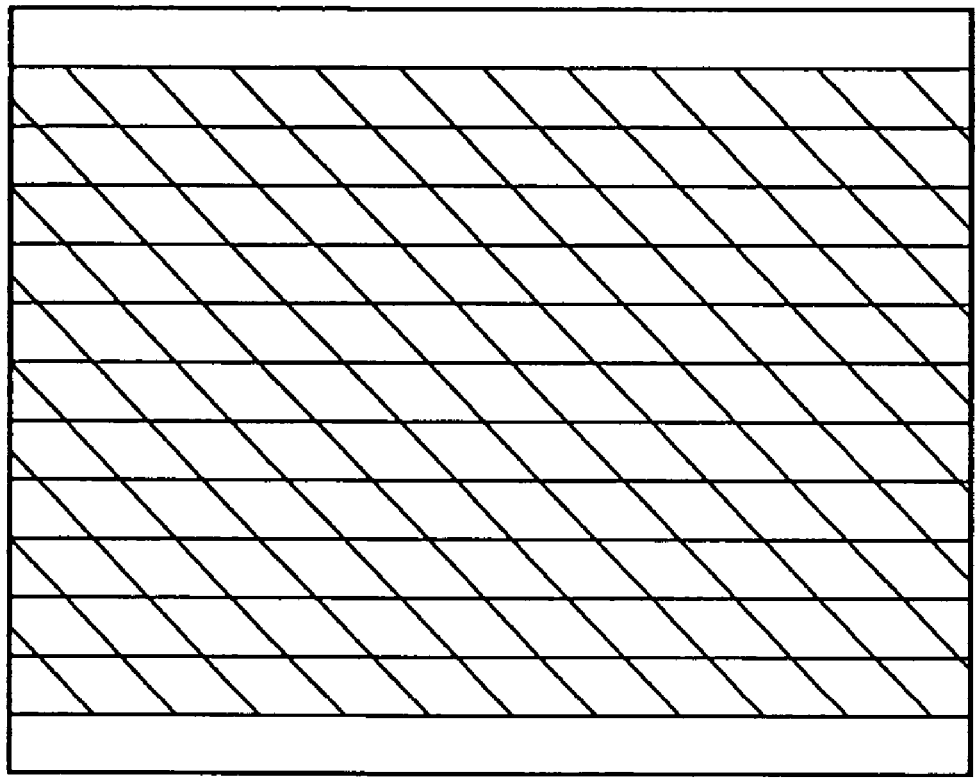
FIG. 13 is a view showing an example of an oblique-noise-generated image.

FIG. 13 is a view showing image noise produced when the above spike noise is superimposed on the signal detection portions. Gate lines (row selection lines Lr) and signal lines (column signal lines Lc) are laid out in the horizontal direction and vertical direction, respectively. Assume that in this case, oblique noise occurs. When such noise is superimposed on a sensed image, the image quality considerably deteriorates. In the case of a medical image, in particular, such noise may cause a wrong diagnosis.

This oblique noise occurs because when data in a given signal line are sequentially A/D-converted until the next line is sampled after the given line is sampled/held, spike noise from the DC/DC power supply is superimposed on the data. This noise appears in the form of oblique lines because of the beats between the frequency of the noise and the frequency of A/D conversion. The oblique angles change in accordance with the beat frequency. In addition, noise appears in the form of vertical lines instead of oblique lines without beat.

An example of the implementation of the operation of reducing noise in the oblique or vertical direction like that described above will be described below with reference to the timing charts of FIGS. 14 and 15 and FIG. 12.

When image information is to be read from the photodetector array 58, the timing signal generating unit 901 generates CLK as a reference clock for the DC/DC power supply 902 and the line driving signal CPV with a period of an integer multiple of that of CLK. In general, the oscillation frequency of the DC/DC power supply is 10 kHz to several hundred kHz, and a line driving frequency (switching frequency for row selection lines) for driving the photodetector array 58 is several kHz. If, for example, the frequency of CLK is 100 kHz, and the line driving frequency is 2 kHz, the frequencies of CLK and CPV have an integer multiple relationship. FIG. 14 shows in a simple manner that the line driving signal CPV and sample/hold timing signal SH are synchronized with the reference clock CLK of the DC/DC power supply 902 within one line, CLK has an integer multiple relationship with the line frequency of CPV, and CLK is continuous between lines.

According to the above driving form, since the operation of reading signals for each line is synchronized with the PWM signal, vertical noise occurs. However, the above synchronous operation is not essential.

Note that the CLK signal for the DC/DC power supply 902 may be constantly generated or generated only in real reading. In this case, the DC/DC power supply 902 may incorporate a CR oscillator to operate by free run at a predetermined frequency when no CLK is input. Alternatively, the total efficiency of the system can be adjusted by setting this free-run frequency at a point at which the efficiency of the DC/DC power supply 902 changes.

In real reading (Frx), pixel signals are read on a row basis. FIG. 10 shows reading operation on the Nth row. First of all, the timing signal generating unit 901 generates a reset signal RC in synchronism with the reference clock CLK. The switch element 102 is turned on/off by the reset signal RC to reset a column signal line Lc. Thereafter, the line driving signal CPV is sent to the line selector 92 to turn on the TFT switch SW of the selected row selection line and turn on the OE signal to enable the output of the multiplexer 110. The electric charges stored in the respective photoelectric conversion elements PD on the selected row selection line Lr are transferred to the signal reading circuit 100 via the column signal line Lc. When the transfer is complete, the timing signal generating unit 901 sends out the sample/hold signal SH to cause the sample/hold circuit 108 to hold the output from the signal reading circuit 100, i.e., a voltage value corresponding to the transferred electric charge.

Subsequently, the timing signal generating unit 901 sends out a line driving signal in the same manner and sends out the signal line reset signal RC for reading the next line. The voltage value held on the previous line is sent to the A/D converter 112 to be converted into a digital signal until the next sample/hold signal is sent out.

As described above, 256 systems of reset switches 102, preamplifiers 103, and sample/hold circuits 108, with each system including a switch element, preamplifier, and S/H circuit for one signal line, are integrated into an amplifier IC. In this case, five amplifier ICs are provided. These amplifier ICs are sequentially selected by the signals CSD0 to CSD4. Outputs from a selected IC are sent to the A/D converter 112 via the multiplexer 110. That is, the outputs of 256 systems from the amplifier IC are sequentially sent from the multiplexer 110 to the A/D converter 112 in synchronism with the CK signal, and are sequentially converted into digital signals in accordance with the CK signal.

By repeating the above operation, all the lines are read. Although the timing signal generating unit 901 generates various kinds of signals, the timing (phase) of each within one line is kept unchanged and constant. For example, the reset signal RC and line driving signal CPV have a period of an integer multiple of the reference clock CLK, and the sample/hold signal is turned on after a predetermined period of time elapses since RC or CPV is turned on (the sample/hold signal is turned on when a predetermined number of CLK signals is counted after RC or CPV is turned on, or the sample/hold signal is turned on at the timing of the time-out of a predetermined timer which is started when RC or CPV is output). For this reason, the relationship between the sample/hold timing and the CLK signal for the DC/DC power supply 902 remains unchanged through the lines, and a phase relationship is maintained. Even if, therefore, the timing at which sampling/holding is performed coincides with a point where power supply noise is large, since all the lines are read at the same point, i.e., noise with the same phase is superimposed, it becomes hard to see noise on lines on an image.

Figure 14:
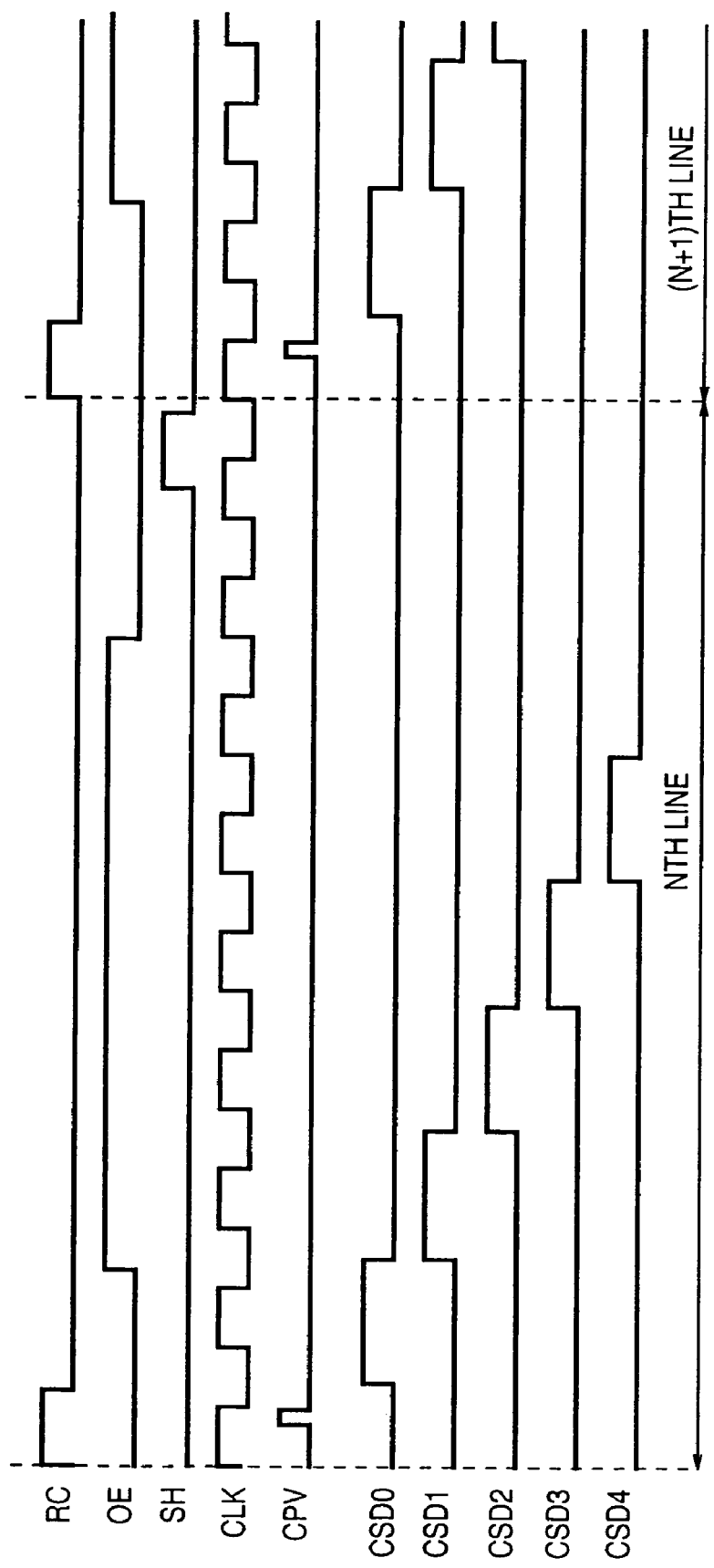
FIG. 14 is a timing chart for explaining line reading operation by the X-ray imaging system according to the embodiment.
Figure 15:
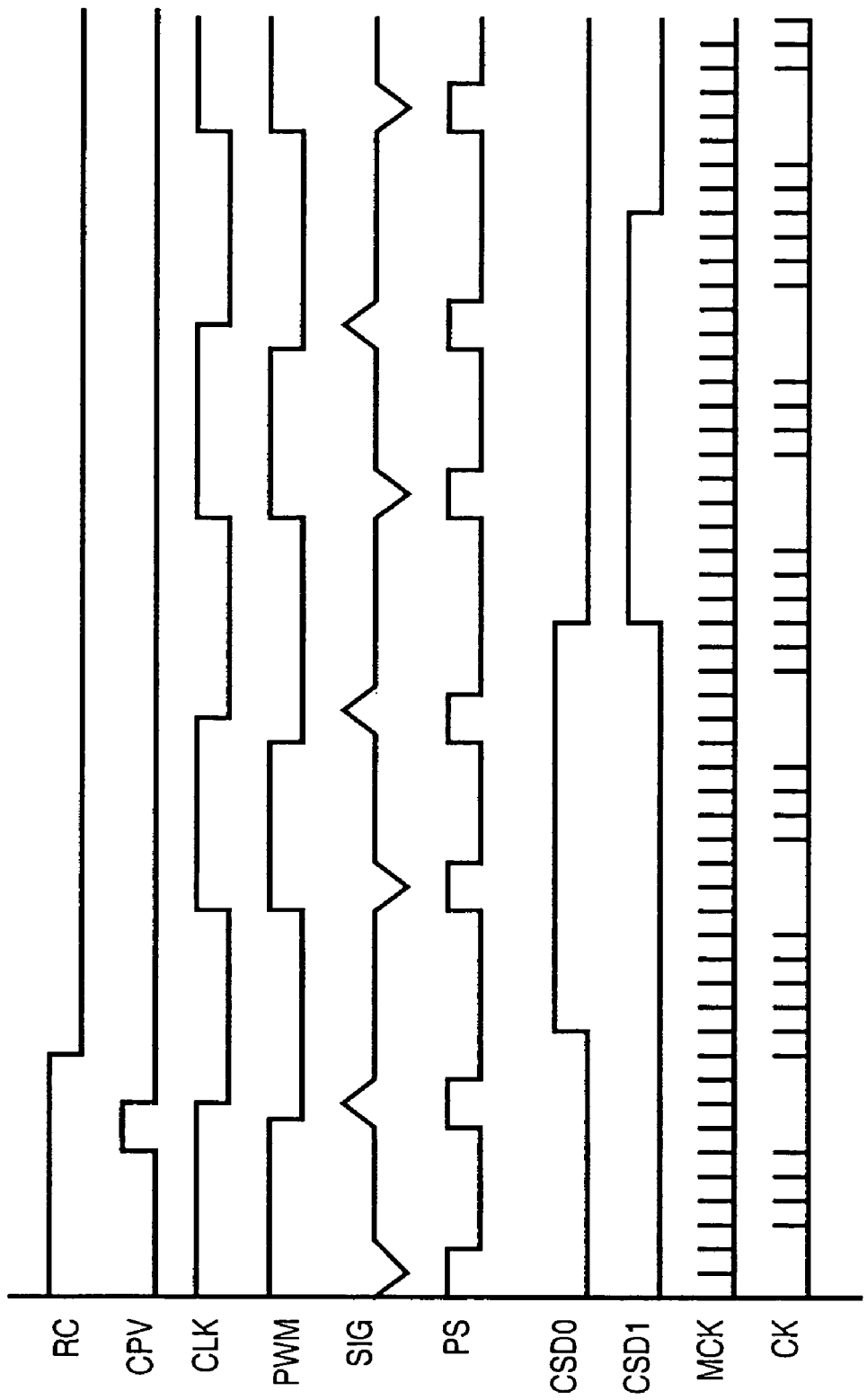
FIG. 15 is a detailed timing chart showing an enlarged view of part of the line reading operation in FIG. 14.

FIG. 15 is an enlarged view of part of the timing chart of FIG. 14, and is a timing chart for each signal in detail. Although FIG. 15 is an enlarged view showing operation up to the timing at which CSD1 in FIG. 14 is turned off, new items are added, and unnecessary items are omitted. A repetitive description of the same contents as those in FIG. 14 will be avoided.

Reference symbol PWM denotes a pulse width signal which is oscillated in accordance with the reference clock CLK and changes in the DC/DC power supply 902 in accordance with a load, i.e., a signal actually oscillated by the DC/DC power supply. FIG. 15 shows a case wherein PWM falls slightly before a trailing edge of CLK.

Reference symbol SIG denotes a signal output from the multiplexer 110. FIG. 15 shows how spike noise is superimposed on the signal SIG at switching points (ON/OFF transition points) of the signal PWM. Since causes of spike noise and a superimposition route have already been described, a description thereof will be omitted. Although it all depends, the duration of spike noise is about 10 ns to several hundred ns. The waveform and time of SIG are determined in accordance with the duration of spike noise in the DC/DC power supply and the response characteristics of signal circuit systems which output signals which are superimposed.

The signal PS is ON for the duration of spike noise described above from each leading edge and each trailing edge of the signal PWM input to the reading control unit 904. Note that the duration of spike noise is set to a value with a predetermined margin on the basis of the actual measurement value obtained by an actual apparatus.

A/D conversion will be described next. Assume that the line shown in FIG. 15 is the Nth line. In this case, data sampled at the (N−1)th line are sequentially A/D-converted until a sample/hold signal for the Nth line is input. In the prior art, an amplifier IC is selected by the CS signal, and the multiplexer 110 and A/D converter 112 are driven by the master clock MCK to sequentially read and digitize the data held in the amplifier IC. As shown in FIG. 15, with this operation, however, a signal on which noise is superimposed at spike points is A/D-converted. In contrast, in this embodiment, the timing signal generating unit 901 controls CK and CSD in the following manner.

The clock CK for A/D conversion is a signal which turns off the master clock MCK during the ON period of the PS signal. First of all, the timing signal generating unit 901 turns on CSD0 to select an amplifier IC. CSD0 is kept ON until the 256 data held in the selected amplifier IC are completely A/D-converted, i.e., 256 clocks CK are input (clocks CK may be counted). Upon reception of CK, the multiplexer 110 sequentially outputs the 256 signals held in the amplifier IC one by one, for each pulse of the CK signal, to the A/D converter 112. The A/D converter 112 digitizes each signal in synchronism with CK. With this operation, the same amplifier IC is kept selected until all the data in the amplifier IC selected by the multiplexer 110 are completely converted. When all the data in the amplifier IC are converted, CSD0 is turned off, and CSD1 is turned on to select the next amplifier IC. Subsequently, the same contents as those descried above are repeated to A/D-convert all data.

According to the above operation, no CK is output at a switching point (i.e., while the signal PD is ON), and no A/D conversion is performed. This prevents a signal on which spike noise is superimposed from being digitized, which in turn prevents the occurrence of oblique noise or vertical noise on an image.

Note that the ON period of each CSD is equal to the sum of a period of time corresponding to the 256 pulses of CK and the cumulative time of the periods of PS. Therefore, as the PS period increases, the CSD period increases, and the processing time (the sum of all signals CSD) required for all the amplifier ICs increases. Since A/D conversion of the data held in the amplifier IC selected at last needs to be complete before the next sample/hold signal, the PS period is limited by this condition.

Since the pulse width slightly changes in accordance with a load owing to PWM, the occurrence timing of spike noise varies. However, the reading control unit 904 generates the PS signal corresponding to this variation, no problems arise. Obviously, in order to improve the synergistic effect, it is preferable to select constants, an arrangement, and components to further reduce ripple noise and spike noise.

In this embodiment, the DC/DC power supply is oscillated in synchronism with externally supplied CLK. However, the present invention is not limited to this. With a general power supply incorporating a CR oscillator as well, similar effects can be obtained by using a signal synchronized with oscillation, e.g., the PWM signal. If, however, a plurality of independent power supply systems are used, since the oscillation frequencies of the respective systems slightly differ from each other, a signal must be generated by adding (Oring) the PS signals corresponding to the respective PWM signals. This applies to power supply systems which operate on signals CLK if the signals CLK differ from each other in the respective independent power supply systems.

Although this embodiment has exemplified the PWM type DC/DC power supply, similar effects can be obtained by applying the present invention to a frequency modulation type DC/DC power supply and an AC/DC power supply. For example, in a frequency modulation type DC/DC power supply, an output voltage is stabilized by changing the oscillation frequency of a clock with a change in load. According to the frequency modulation type, therefore, a spontaneous oscillation clock (to be referred to as CLKS) is used to drive the power supply. It suffices if the reading control unit 904 receives CLKS and generates spike noise occurrence period signals PS at the timings of the leading edge and trailing edge of CLKS.

As has been described above, according to this embodiment, when signals from the flat panel sensor are to be sampled/held for each line, and a plurality of held data within one line are to be sequentially A/D-converted, reading control is performed to execute timing control so as not to perform A/D conversion at any change point of an oscillation signal for the DC/DC power supply. This can prevent the influence of spike noise even when conductive noise from the DC/DC power supply which supplies power to the flat panel sensor and its peripheral circuits, and more particularly common mode spike noise, are superimposed on the flat panel signal detection circuit. This makes it possible to achieve reductions in the size and weight of the imaging unit without mounting any countermeasure components such as a ferrite core, which pose problems in terms of reductions in size and weight and cost.

Note that the present invention is not limited to the DC/DC power supply, and similar effects can be obtained in the case of an AC/DC power supply. Furthermore, the present invention can be applied not only to a PWM type power supply but also to a frequency modulation type DC/DC power supply, and can be adapted to a wide variety of switching power supplies.

It should be obvious that the sample/hold timing control described in the first embodiment can be used together with the timing control on the operation of the A/D conversion system described in the second embodiment.

As has been described above, according to the second embodiment, even if a switching power supply such as a DC/DC power supply is mounted in an imaging unit, low-noise, stable images can be provided.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-321144 filed on Sep. 12, 2003 and Japanese Patent Application No. 2003-321145 filed on Sep. 12, 2003, which are hereby incorporated by reference herein.

What is claimed is:

1. An image signal reading apparatus comprising:
a switching power supply which supplies power;
a detector array including two-dimensionally arranged detectors;
a reading unit which reads signals from the detectors for each row in said detector array as a unit, and holds the signals in a hold portion; and
a generating unit which generates a reference clock for said switching power supply, a switching signal for switching a read target row in said reading unit, and a timing signal for specifying the hold timing to hold the sianals in the hold portion,
wherein the generating unit generates the switching signal and the timing signal in synchronism with the reference clock at a period of an integer multiple of the reference clock.

2. The apparatus according to claim 1, wherein said switching power supply includes a plurality of independent voltage output portions, and at least one of the voltage output portions operates in accordance with the reference clock.

3. The apparatus according to claim 1, wherein said switching power supply operates on the basis of the reference clock during a period of signal reading from said detector array, and operates on the basis of another clock during another period.

4. An X-ray imaging apparatus comprising:
an image reading apparatus defined in claim 1; and
an X-ray generator,
wherein said detector array holds a signal based on an X-ray emitted from said X-ray generator.

5. An image signal reading method of reading signals from a detector array including a switching power supply and two-dimensionally arranged detectors, comprising:

a reading step of reading signals from the detectors for each row in the detector array as a unit, and holding the signals in a hold portion; and
a generating step of generating a reference clock for said switching power supply, a switching signal for switching a read target row in said reading step, and a timing signal for specifying the hold timing to hold the signals in the hold portion,
wherein the generating step generates the switching signal and the timing signal in synchronism with the reference clock at a period of an integer multiple of the reference clock.

6. An image signal reading apparatus comprising:
a switching power supply which supplies power to at least part of the apparatus;
a detector array including two-dimensionally arranged detectors;
a reading unit which reads signals from the detectors for each row in said detector array as a unit;
a conversion unit which sequentially converts signals corresponding to one line, which are read by said reading unit, into digital data on a pixel basis; and
a generating unit which generates signals to perform conversion processing by said conversion unit, in periods except for periods including change points of an oscillation signal of said switching power supply.

7. The apparatus according to claim 6, wherein said generating unit generates a reference clock for said switching power supply, and
said switching power supply includes a plurality of output systems, and each of the output systems generates a predetermined voltage by modulating the reference clock.

8. The apparatus according to claim 6, wherein
said conversion unit performs analog-to-digital conversion in accordance wit a driving clock, and
said generating unit stops supply of the driving clock to said conversion unit only during a predetermined period from the change point.

9. The apparatus according to claim 6, wherein a period of switching a signal reading target row in said reading unit is set to an integer multiple of the reference clock from said switching power supply.

10. An X-ray imaging apparatus comprising:
an image signal reading apparatus defined in claim 6; and
an X-ray generator,
wherein said detector array holds a signal based on an X-ray emitted from said X-ray generator.

11. A signal reading method of reading signals from a detector array including a switching power supply which supplies power to at least part of an apparatus and two-dimensionally arranged detectors, comprising:
a reading step of reading signals from the detectors for each row in the detector array as a unit;
a conversion step of converting signals read at said reading step into digital data; and
a generating step of generating signals to perform conversion processing by said conversion step, in periods except for periods including change points of an oscillation signal of said switching power supply.

* * * * *

UNITED STATES PATENT AND TRADEMARK OFFICE
CERTIFICATE OF CORRECTION

| | | |
|---|---|---|
| PATENT NO. | : 7,110,498 B2 | Page 1 of 1 |
| APPLICATION NO. | : 10/938429 | |
| DATED | : September 19, 2006 | |
| INVENTOR(S) | : Etsuo Yamada | |

It is certified that error appears in the above-identified patent and that said Letters Patent is hereby corrected as shown below:

(col. 23, line 42), please change "sianals" to --signals--; and
(col. 24, line 37), change "wit" to --with--.

Signed and Sealed this

Twelfth Day of December, 2006

JON W. DUDAS
*Director of the United States Patent and Trademark Office*